US010295130B1

(12) United States Patent
Owens

(10) Patent No.: US 10,295,130 B1
(45) Date of Patent: *May 21, 2019

(54) FRAME SUPPORT FOR HANDMADE PAPER CRAFTS AND LANTERNS

(71) Applicant: Celena Misshola Owens, Baltimore, MD (US)

(72) Inventor: Celena Misshola Owens, Baltimore, MD (US)

( * ) Notice: Subject to any disclaimer, the term of this patent is extended or adjusted under 35 U.S.C. 154(b) by 62 days.

This patent is subject to a terminal disclaimer.

(21) Appl. No.: 15/356,291

(22) Filed: Nov. 18, 2016

Related U.S. Application Data

(63) Continuation-in-part of application No. 14/312,638, filed on Jun. 23, 2014, now Pat. No. 9,541,231.

(51) Int. Cl.

| | |
|---|---|
| ***F16M 11/22*** | (2006.01) |
| ***F21S 6/00*** | (2006.01) |
| ***G09F 23/04*** | (2006.01) |
| ***F21V 1/04*** | (2006.01) |
| ***F21V 35/00*** | (2006.01) |
| ***F21V 17/02*** | (2006.01) |
| ***F21V 21/08*** | (2006.01) |
| *F21W 121/00* | (2006.01) |

(52) U.S. Cl.
CPC .................................... *F21S 6/00* (2013.01); *F21V 1/04* (2013.01); *F21V 17/02* (2013.01); *F21V 21/0824* (2013.01); *F21V 35/00* (2013.01); *G09F 23/04* (2013.01); *F21W 2121/00* (2013.01)

(58) Field of Classification Search
None
See application file for complete search history.

(56) References Cited

U.S. PATENT DOCUMENTS

| | | | |
|---|---|---|---|
| D25,574 S | 6/1896 | Wright | |
| 1,865,453 A | 7/1932 | Baltzley | |
| 1,889,669 A | 11/1932 | Knipe | |
| 2,014,175 A | 9/1935 | Hart | |
| 2,550,355 A * | 4/1951 | James .................... | A47G 7/041 211/181.1 |
| 2,604,288 A | 7/1952 | Koch | |
| 2,791,391 A | 5/1957 | Uphoff | |
| 2,850,826 A | 9/1958 | Testa | |

(Continued)

OTHER PUBLICATIONS

Amaco, Online catalog: http://www.amaco.com, "WireFrame Wire Forms", Feb. 2013 to present, at time of filing.

(Continued)

*Primary Examiner* — Charlie Y Peng

(57) ABSTRACT

Accordingly, several advantages of one or more aspects are as follows: to provide a frame assembly for the creation of handmade paper crafts or lanterns, particularly a with paper or any material that produces similar results, such as fabric that has a stiff but flexible quality to it, comprising metal, sheet metal, plastic, wire, etc., The material is not permanently attached to the frame and can be swapped out for a different style and can be stored away for infinite reuse. An adjustable and removable light holder that can be placed at various elevations on the frame to lower or raise the level of the light within the frame. Short frames that are more stable in windy conditions. One size fits all frames that can be used with substantially short or substantially tall wrap, and is stable in windy or breezy conditions.

27 Claims, 25 Drawing Sheets

(56) References Cited

U.S. PATENT DOCUMENTS

| | | | | |
|---|---|---|---|---|
| 2,937,761 | A | 5/1960 | Reed | |
| 3,099,357 | A | 7/1963 | Harris | |
| 3,202,192 | A | 8/1965 | Russo | |
| 3,263,355 | A | 8/1966 | March | |
| 3,481,075 | A | 12/1969 | Dastoli | |
| 4,008,670 | A | 2/1977 | Price | |
| 4,041,881 | A | 8/1977 | Textoris | |
| 4,413,800 | A | 11/1983 | Kelson | |
| 4,903,923 | A | 2/1990 | Krentel | |
| 4,914,857 | A | 4/1990 | Dodgen | |
| 5,034,868 | A * | 7/1991 | Stelfox | F21V 15/01 362/352 |
| 5,179,799 | A | 1/1993 | Hillestad | |
| 5,307,598 | A | 5/1994 | West | |
| 5,784,972 | A | 7/1998 | Emalfarb | |
| 6,279,762 | B1 | 8/2001 | Buchalter | |
| 6,321,921 | B1 | 11/2001 | Massoudnia | |
| 6,364,258 | B1 | 4/2002 | Naranjo | |
| 6,474,843 | B2 | 11/2002 | Sheih | |
| 6,579,578 | B1 | 6/2003 | Lai | |
| D504,789 | S | 5/2005 | Hayes | |
| 7,296,773 | B2 | 11/2007 | Yang | |
| 8,122,691 | B2 | 2/2012 | Weder | |
| 8,136,786 | B2 | 3/2012 | Kepes | |
| 2005/0145760 | A1 * | 7/2005 | Bower | A47G 7/041 248/146 |
| 2009/0206046 | A1 | 8/2009 | Lunato | |
| 2012/0112012 | A1 | 5/2012 | Jackson | |
| 2015/0077980 | A1 | 3/2015 | Coughlin | |

OTHER PUBLICATIONS

Paper Moon Weddings, http://www.polkadotbride.com/2013/05/diy-paper-lantems-tutorial/, May 2013.

* cited by examiner

FRAME SUPPORT FOR HANDMADE PAPER CRAFTS AND LANTERNS

CROSS REFERENCE TO RELATED APPLICATIONS

This application claims the benefit of nonprovisional patent application Ser. No. 14/312,638 filed 2014 Jun. 23, by the present inventor.

FEDERALLY SPONSORED RESEARCH

Not Applicable.

SEQUENCE LISTING, ETC ON CD

Not Applicable.

BACKGROUND—PRIOR ART

The following is a tabulation of some prior art that presently appears relevant:

U.S. Patents

| Pat. No. | Kind Code | Issue Date | Patentee |
|---|---|---|---|
| 1,865,453 | A | 1932 Jul. 5 | Louis Baltzley |

U.S. Pat. application Publications

| Publication No. | Kind Code | Publ. Date | Applicant |
|---|---|---|---|
| 20050145760 | A1 | 2005 Jul. 7 | Necia Bower, Peter Heller |

Foreign Patent Document

| Foreign Doc. No. | Cntry Code | Kind Code | Pub. Dt | App or Patentee |
|---|---|---|---|---|
| 102062303 | CN | A | 2011 May 18 | — |
| 201251093 | CN | Y | 2009 Jun. 3 | — |
| 102012111927 | DE | B3 | 2013 Dec. 24 | Patentinhaber Gleich |

Nonpatent Literature Documents

Amaco, www.AMACO.com, "WireFrames Wire Forms" (2013-2014) Paper Moon Weddings, http://www.polka-dotbride.com/2013/05/diy-paper-lanterns-tutorial/, (May 2013)

Description of Related Art

Paper lanterns have been in existence throughout history. Most lanterns are manufactured and sold with the paper permanently adhered to the frame using glue or a similar adhesive. Paper lanterns are typically used for decorative purposes for holidays, parties, weddings, etc. They are also often used in home decor. The antique and retro styled paper lanterns typically have multiple panels where individual pieces of paper are permanently attached to each panel. This style lantern is usually designed to maintain the same paper design throughout the life of the lantern. The problem is that if paper panels are damaged, they would have to be replaced professionally.

Currently, the most common paper lanterns used today for party decoration, are for example, in China patent 201,251,093, (2009). The paper is glued to the frame and it comes with a plastic device that is used to hold open the flattened paper lantern, while in use. These lanterns may last for several uses, but they are fragile and have a very short life span. Once the paper becomes faded or is torn, the lantern is no longer usable and must be discarded. Additionally, because these paper lanterns come in a specific permanent color, it may not be useful for subsequent events that have a different color scheme. This design is not configured to enable one to change out the paper, or to reuse the frame to simply create one's own lantern. There is also no provision to mount or stake these lanterns.

There are also the do-it-yourself (DIY) paper lanterns. These are made using a sheet of paper, adhesive or staples, and are typically suspended on a string. Although handmade paper centerpieces and paper lanterns are typically simple to do, putting them on display is much more cumbersome. These are flimsy and generally cannot stand erect on a table or on the ground. This flimsy nature makes the DIY decoration look homemade and unsophisticated. These handmade DIY lanterns do not have accommodations for a light source to be used, such as a tea light or an LED light. If it is desired that the paper lantern stands erect and on its own, there is the risk of it slouching for lack of support. Accommodations must then be made to create a support, such as using a jar, and the like, to use as a support for the paper lantern. In this case, one must go through great lengths to create or provide a frame for a handmade paper lantern. Cardstock paper can be used to create a sturdier paper lantern that may stand on its own, but the paper thickness may limit the emitting of light through the paper.

The configuration disclosed in China, Publication 102,062,303, (2011), describes a method for handmade lanterns using bamboo, rice paper, pen and ink. This however uses a specific type of paper, rice paper. The paper is glued to the frame creating a lantern where the paper is permanently affixed to the frame. This method is cumbersome and creates a lantern that has the paper permanently affixed to the frame, and cannot be disassembled for compact storage.

There is the WireFrames product sold online by AMACO in the year 2013 to present year (2014), http://www.amaco-.com, that was designed to enable the user to create for all types of craft projects which may include a picture frame, candle holder, etc., however; this device is flimsy and does not stand on its own. There are elastic cords provided to make the frame free standing, but these cords are not sturdy in its support, and are highly susceptible to breakage. This design requires that the user use crafting to provide a method to make the frame rigid and more stable. The frame is also too large to accommodate standard sized scrapbook paper and smaller. This frame does not enable the paper to be elevated at various points along the frame. This frame also does not provide a support for a candle or light source. If a light source is desired, the end user must make a support.

The above mentioned do not provide a way to create customized paper lanterns that can be infinitely redesigned with minimal effort. They do not have a way to create paper displays or lanterns that are extremely varied in size, substantially tall or substantially short, using the same frame.

Additionally, when used outdoors in windy conditions, or indoors with fans, frame embodiment can become unstable in windy or breezy conditions. The above mentioned does not provide a way to stabilize said frame embodiment in windy or breezy conditions.

BRIEF SUMMARY OF THE INVENTION

Background

In accordance with one embodiment, a frame assembly comprising support legs that are sloped, particularly with a slight slope, making the frame slightly narrower at the top and widens gradually from the top, on down. This relates to frames for paper lanterns or for paper crafts, particularly to self-standing frames that support a stiff wrap 23 comprising paper, fabric, stiff or stiffened fabric, wire, light flexible sheet metal, flexible plastic, or any material that produces similar results, and that have a plurality of vertical support legs that enable wrap 23 to be elevated at various points along the vertical supports of the frame. Said frame is generally a skeletal frame. The vertical supports are straight and smooth in order that the wrap 23 can glide along vertical supports 20. The frame has a plurality of substantially vertical supports that have a slight slope making the frame slightly narrower at the top and widens gradually from the top of said frame, down. In accordance with another embodiment, a substantially shortened frame that have either vertical support legs that are straight with no slope, or said vertical support legs that have a slight slope. The shortened frame creates more stability for lantern or paper craft with said frame, in windy or breezy conditions. They both are capable of being used with short wrap 23 and tall wrap 23, for the ability to create a variety of styles with the same said frame.

Advantages

Accordingly, several advantages of one or more aspects are as follows: to provide a frame assembly for the creation of handmade paper crafts or lanterns or paper crafts, particularly paper lanterns for use with paper or any material that produces similar results, such as fabric that has a stiff quality to it, sheet metal, plastic, wire, etc., The material is not permanently attached to the frame and can be swapped out for a different style wrap 23 and can be stored away for infinite reuse. An adjustable and removable light holder that can be placed at various elevations on the frame in order to lower or raise the level of the light within the frame. Another advantage is that several embodiments are more stable when said frame is used in windy or breezy conditions.

DRAWINGS—FIGURES

Figure 3:
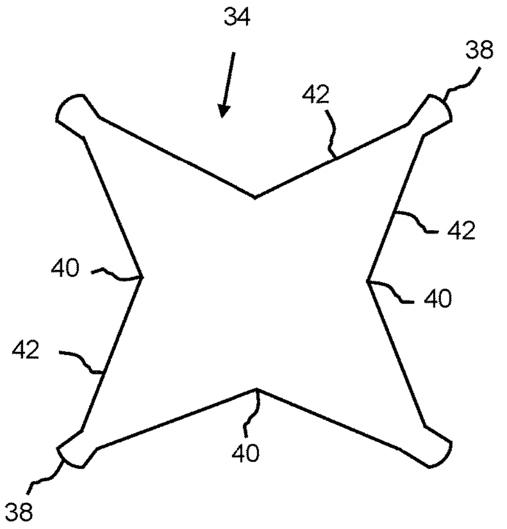
FIG. 3 is a top view of contoured stopper 34 that has a contoured shape that is configured to go inwardly towards the center of said frame.
Figure 3A:
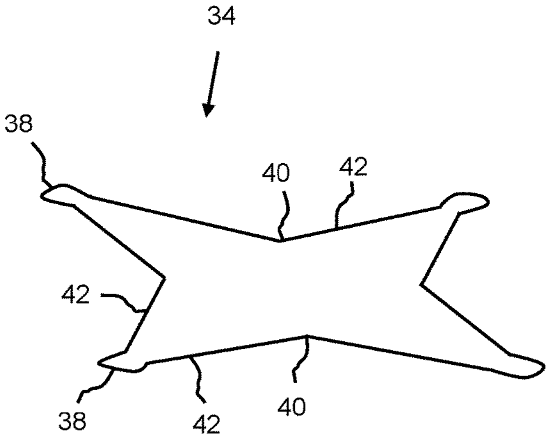
FIG. 3A is an isometric view of contoured stopper 34.
Figure 3B:
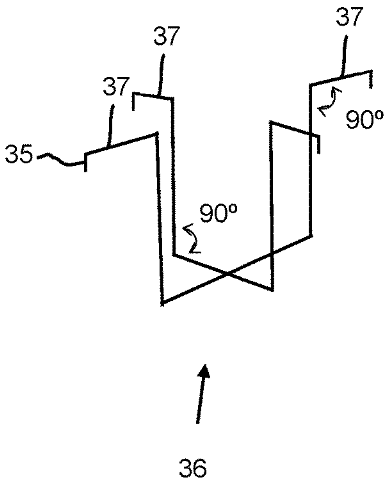
FIG. 3B is an isometric view removable light holder 36.
Figure 3C:
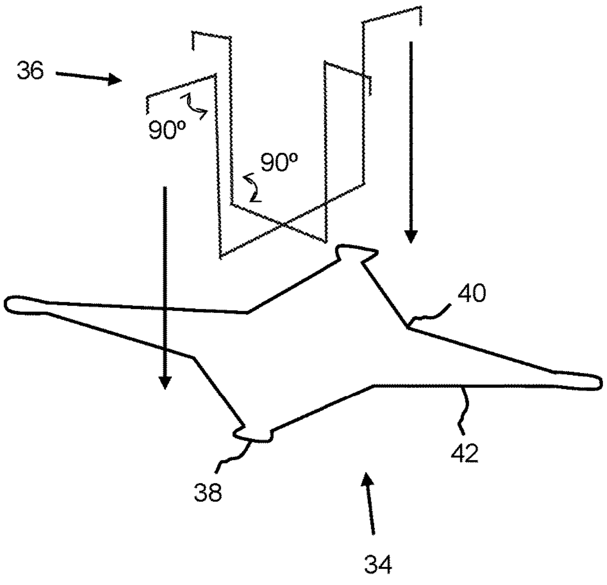
FIG. 3C is an exploded view of removable light holder 36 in use with contoured stopper 34.
Figure 3D:
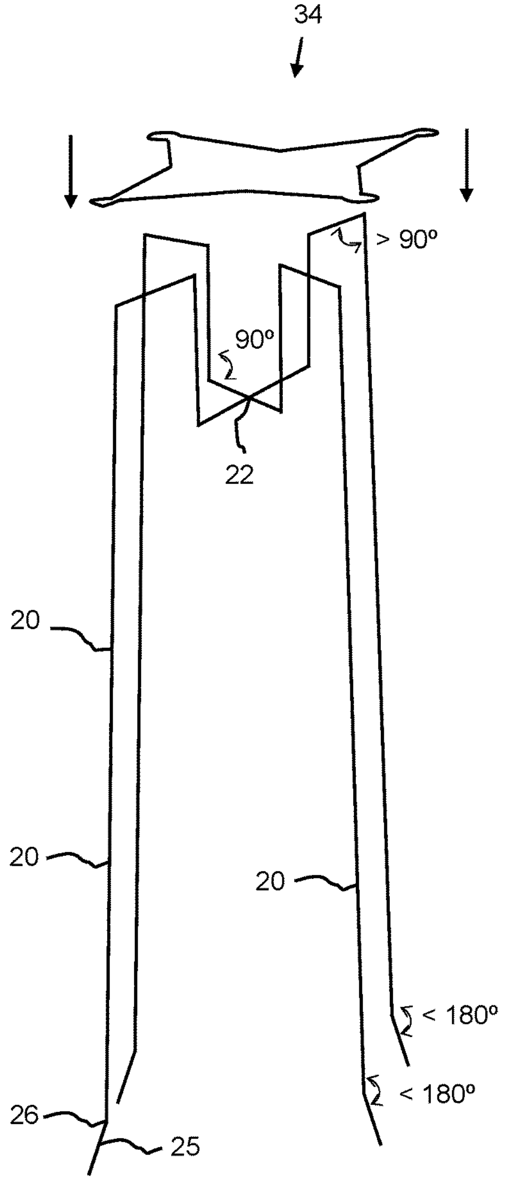
FIG. 3D is an exploded view of contoured stopper 34 and frame embodiment.
Figure 3E:
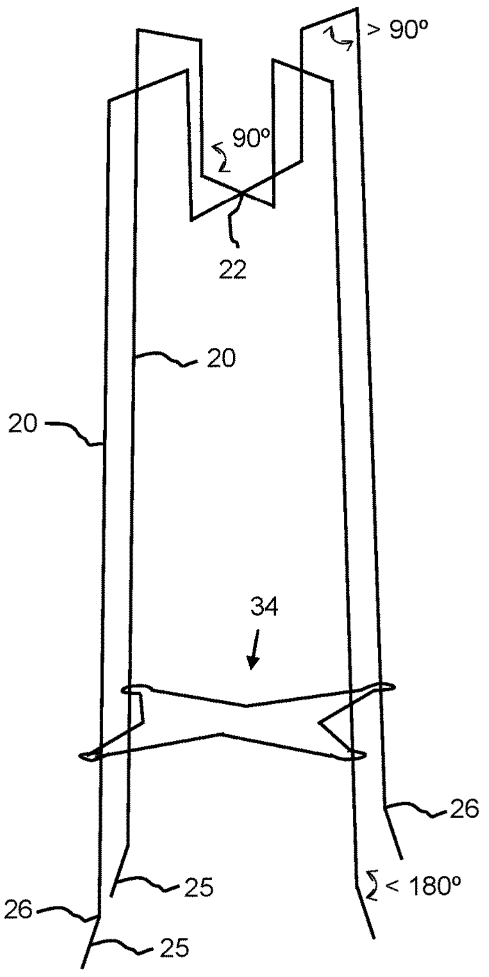
FIG. 3E is an isometric view of frame embodiment in use with contoured stopper 34.
Figure 3F:
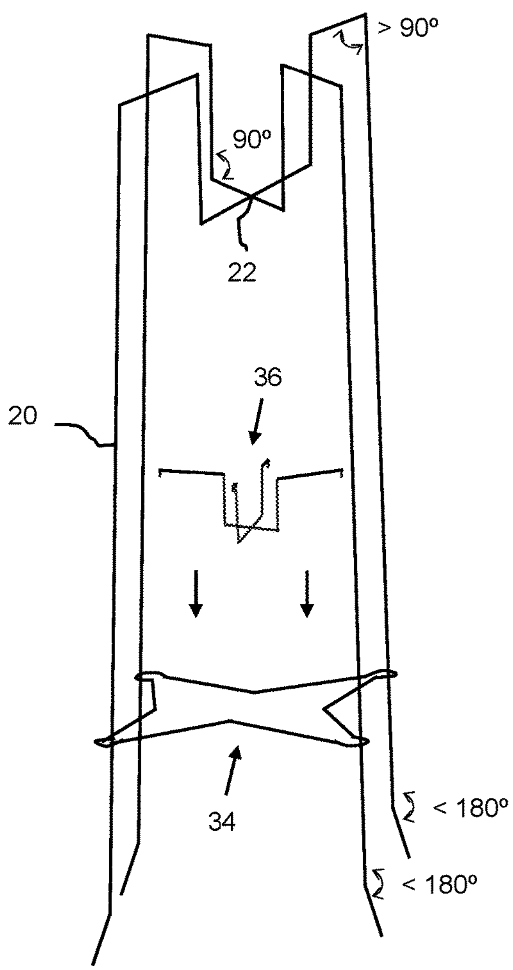

FIG. 3F is an isometric view of frame embodiment in use with contoured stopper 34 showing how removable light holder 36 would be placed onto contoured stopper 34.

Figure 3G:
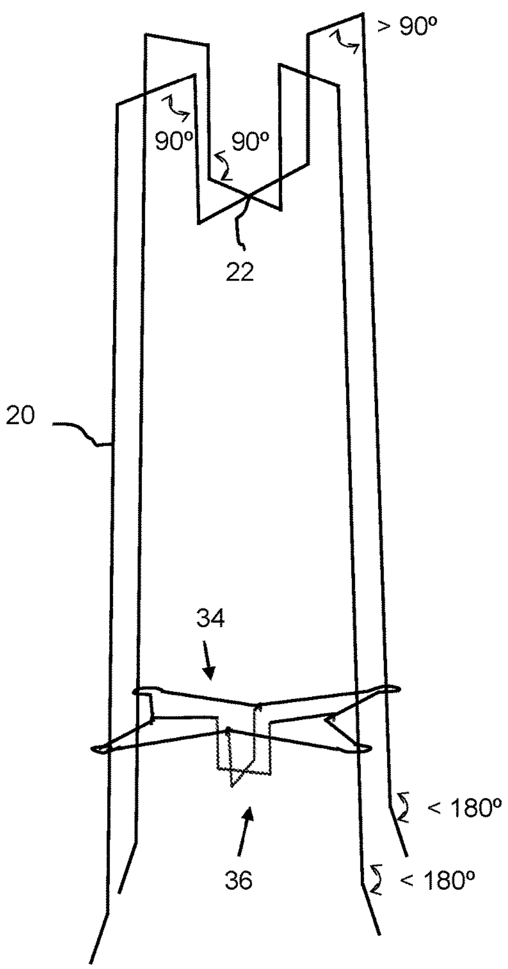

FIG. 3G is an isometric view of frame embodiment in use with contoured stopper 34 and removable tea light holder 36.

Figure 4:
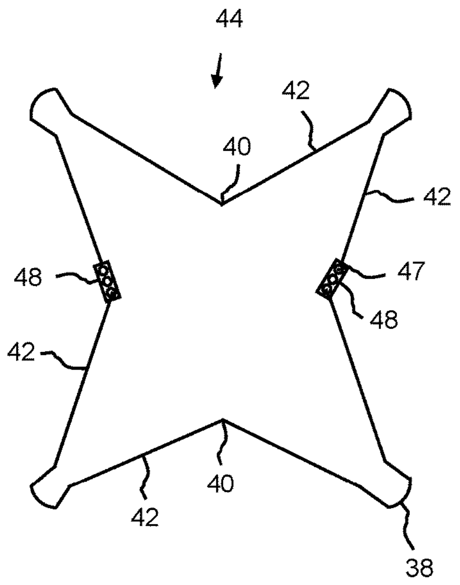
Figure 4A:
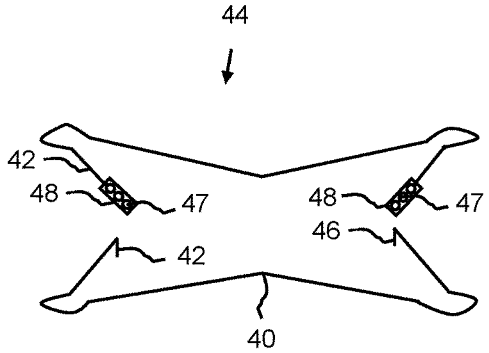

FIGS. 4 and 4A are top and isometric views of adjustable contoured stopper 44.

FIG. 4 demonstrates anchor 46 being plugged into anchor plate 48. FIG. 4A demonstrates when anchor 46 is not plugged into anchor plate 48.

Figure 4B:
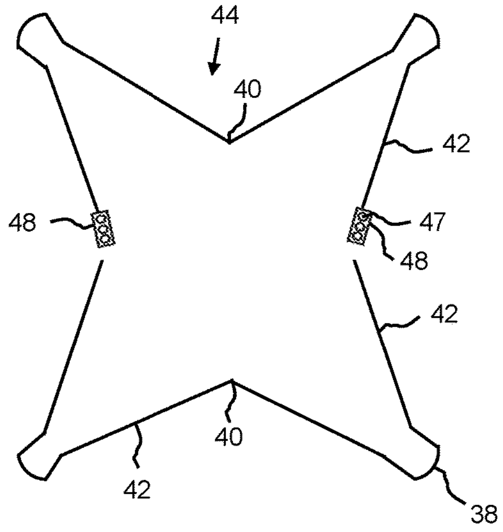

FIG. 4B is a top view of adjustable contoured stopper 44 when anchors 46 are not plugged into anchor plates 48.

Figure 4C:
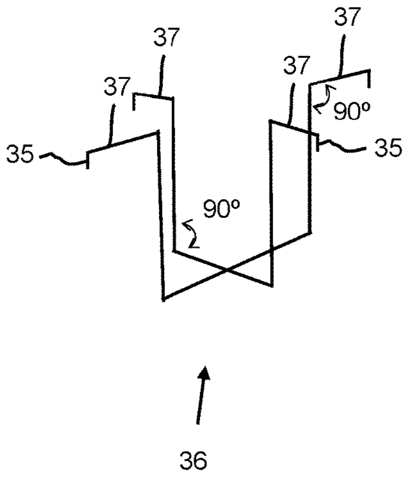

FIG. 4C is an isometric view of removable light holder 36.

Figure 4D:
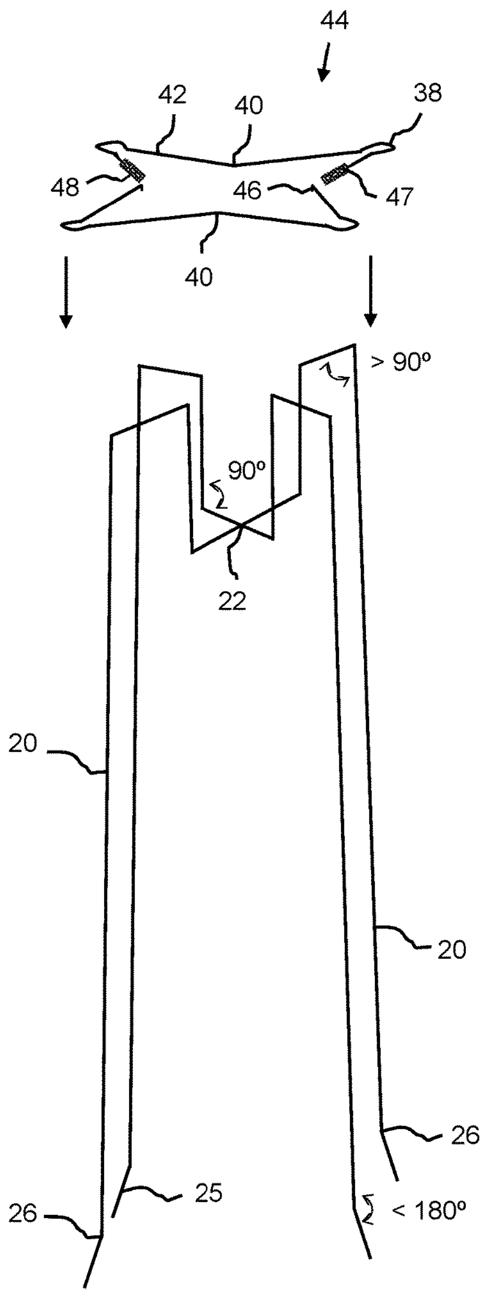

FIG. 4D is an isometric view of adjustable contoured stopper 44 demonstrating how it would be placed onto frame embodiment.

Figure 4E:
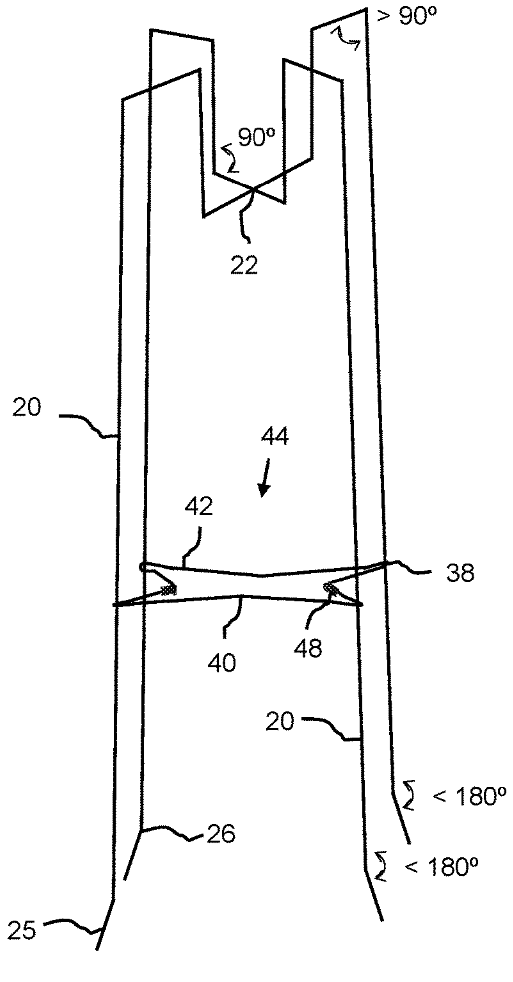

FIG. 4E is an isometric view of frame embodiment in use with adjustable contoured stopper 44.

Figure 4F:
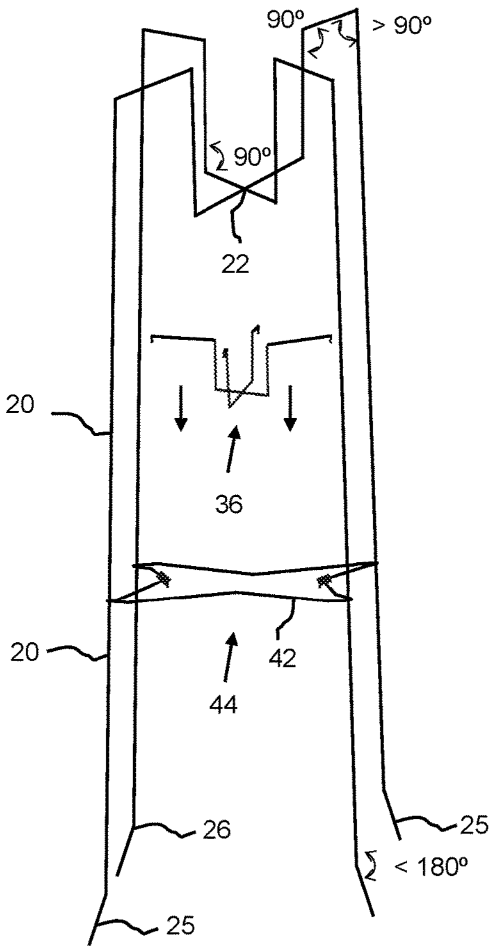

FIG. 4F is an isometric view of frame embodiment and adjustable contoured stopper 44 demonstrating how removable light holder 36 would be placed on said stopper.

Figure 4G:
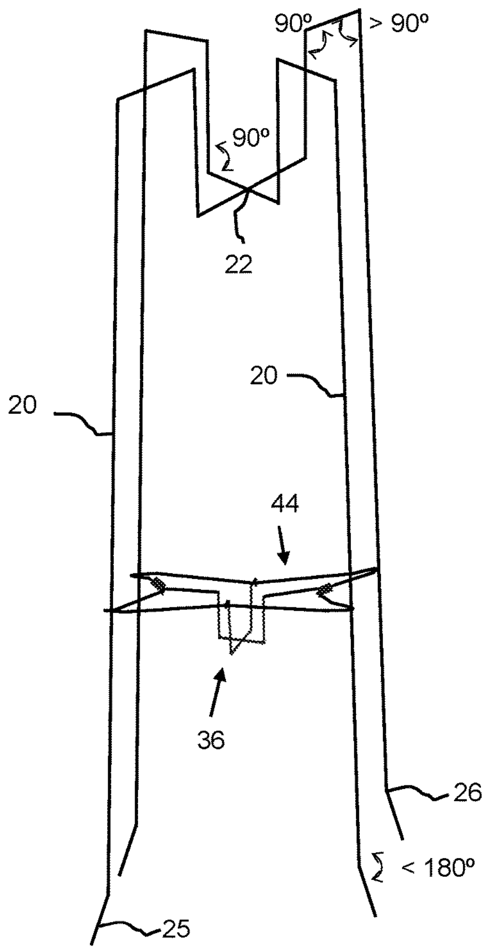

FIG. 4G is an isometric view of frame embodiment in use with adjustable contoured stopper 44 and removable light holder 36.

Figure 5:
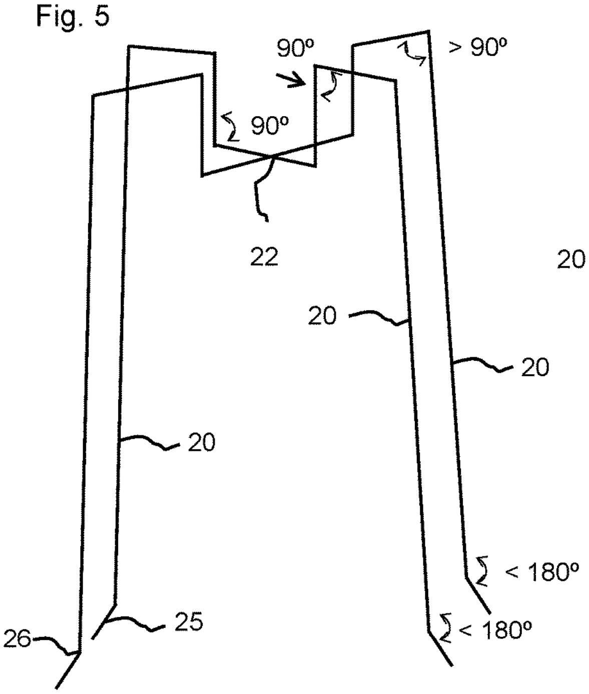

FIG. 5 is an isometric view of a short frame embodiment with a plurality of vertical support legs 20 each comprising a foot 25, and an ankle 26.

Figure 5A:
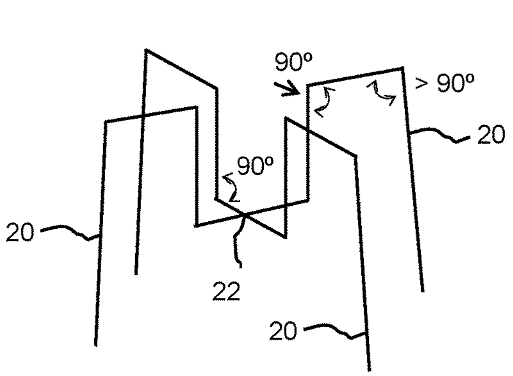

FIG. 5A is an isometric view of a short frame embodiment without feet.

Figure 5B:
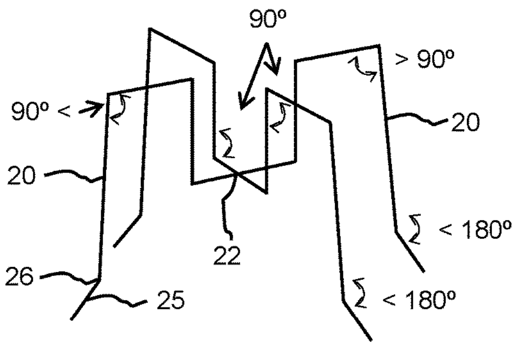

FIG. 5B is an isometric view of a short frame embodiment with a plurality of vertical support legs 20, each having a slight slope and each said support leg comprising a foot 25.

Figure 5C:
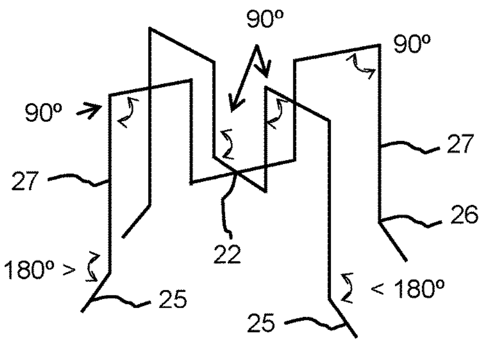

FIG. 5C is an isometric view of a short frame embodiment with a plurality of vertical support legs 27 each connected to a horizontal support at a 90° angle.

Figure 5D:
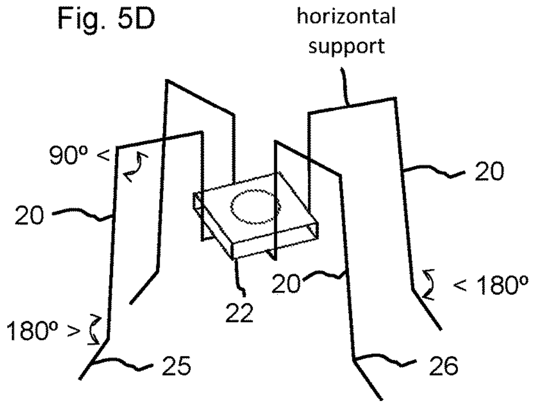

FIG. 5D is an isometric view of a short frame embodiment, comprising a plurality of vertical support legs 20, that contains a square light component in post 22.

Figure 5E:
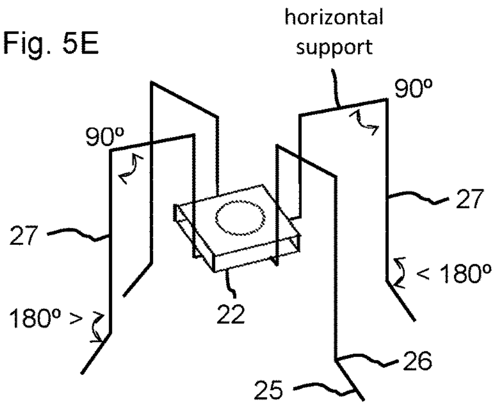

FIG. 5E is an isometric view of a short frame embodiment, comprising a plurality of vertical support legs 27, that contains a square light component in post 22.

Figure 5F:
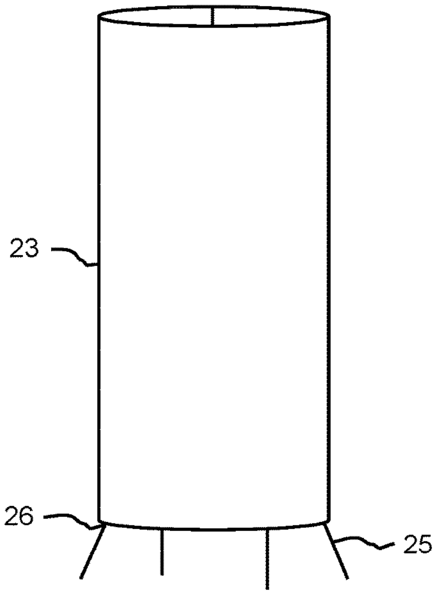

FIG. 5F is an isometric view of frame embodiment as seen in FIG. 5E that comprise of vertical support legs 27 with wrap 23 wrapped, tightened, and secured around vertical support legs 27. Said wrap 23 rests on ankle 26 to keep said wrap 23 from sliding off.

Figure 5G:
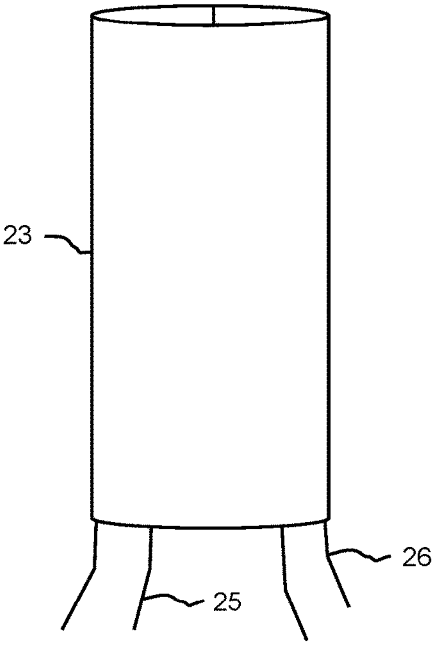

FIG. 5G is an isometric view of frame embodiment as seen in FIG. 5D that comprise of a plurality of vertical support legs 20 each comprising a slight slope that enables wrap 23 to be elevated on said frame as demonstrated in this figure.

Figure 6:
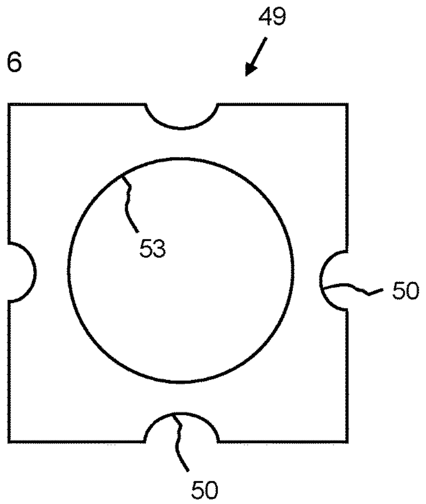
Figure 6A:
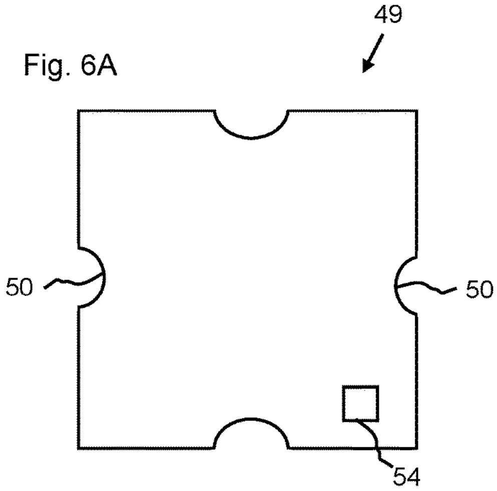
Figure 6B:
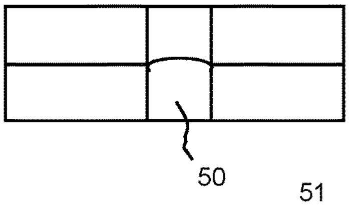

FIGS. 6 and 6A are top and bottom views respectively of fitted light 49 with a plurality of stem notches 50. FIG. 6B demonstrates cord slot 54.

Figure 6C:
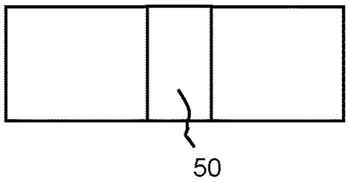

FIGS. 6B and 6C are side views of two different embodiments of fitted light 49. FIG. 6B demonstrates the top and bottom halves fitting together at the midpoint or near midpoint. FIG. 6C demonstrates a fitted light that the bottom side of said fitted light 49 is flat and fits, snaps on or screwed into top half of fitted light 49. The top half is a case that fits over the light interior components while bottom half that is flat closes everything up.

Figure 6D:
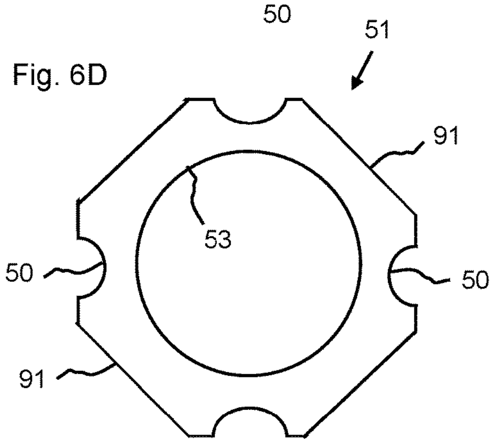
Figure 6E:
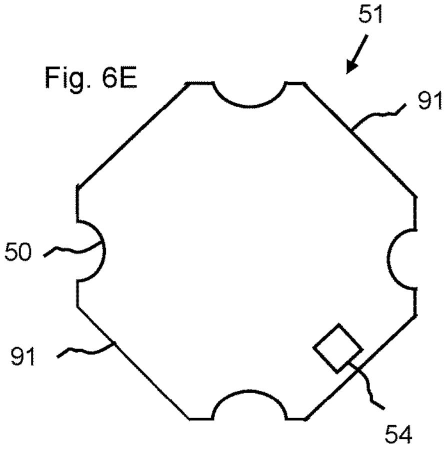
Figure 6F:
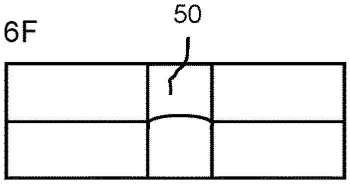
Figure 6G:
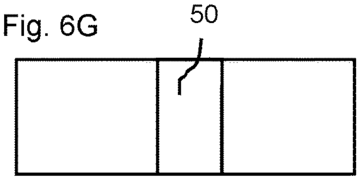

FIGS. 6D and 6E are top and bottom views respectively of fitted light 51 with a plurality of stem notches 50. FIG. 6E demonstrates cord slot 54. Fitted light 51 has flat edges, flush edge 91, where the pointed corners are taken off in order not to interfere with wrap 23 when it is on said frame, for example when said wrap 23 is rectangular and may be poked out by edges of fitted light while in post 22, as seen in FIG. 1B FIGS. 6F and 6G are side views of two different embodiments of fitted light 51. FIG. 6F demonstrates the top and bottom halves fitting together at the midpoint or near midpoint. FIG. 6G demonstrates a fitted light that the bottom side of said fitted light 51 is flat and fits, snaps on or screwed into top half of fitted light 51. The top half is a case that fits over the light interior components while bottom half that is flat closes everything up.

Figure 6H:
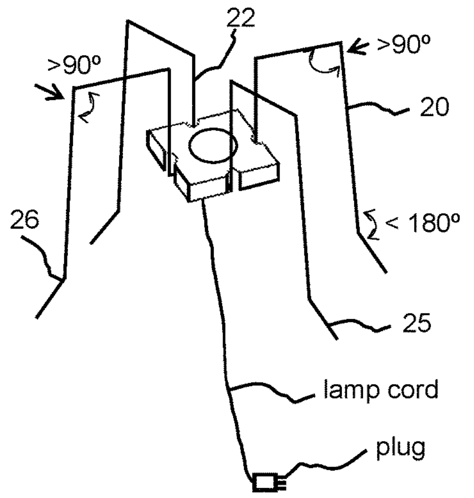
Figure 6I:
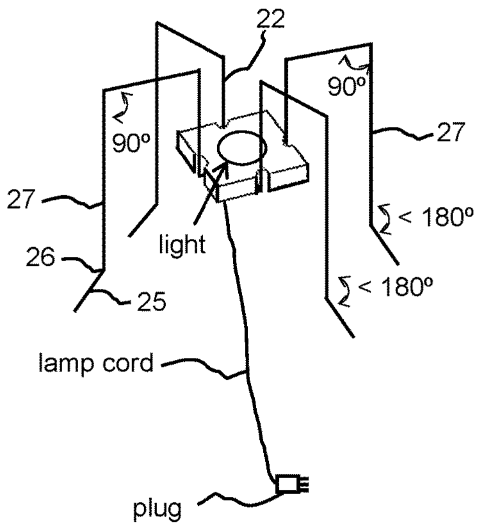

FIGS. 6H and 6I are isometric views of short frame embodiments comprising vertical support legs 20 and vertical support legs 27, respectively. Each comprising fitted light 49.

Figure 6J:
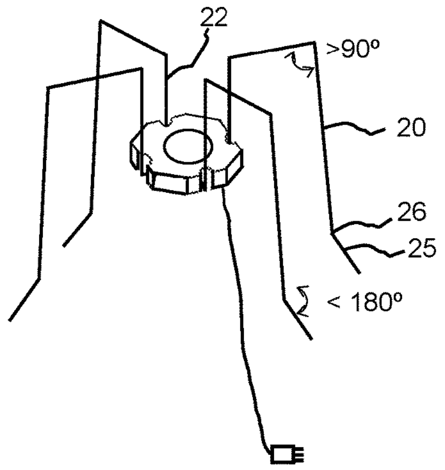
Figure 6K:
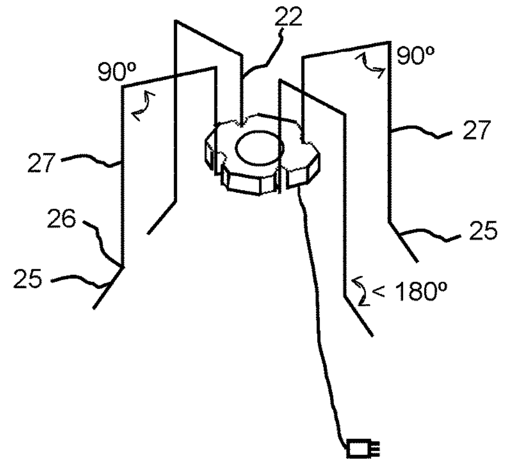

FIGS. 6J and 6K are isometric views of short frame embodiments comprising vertical support legs 20 and vertical support legs 27, respectively. Each comprising fitted light 51.

Figure 7:
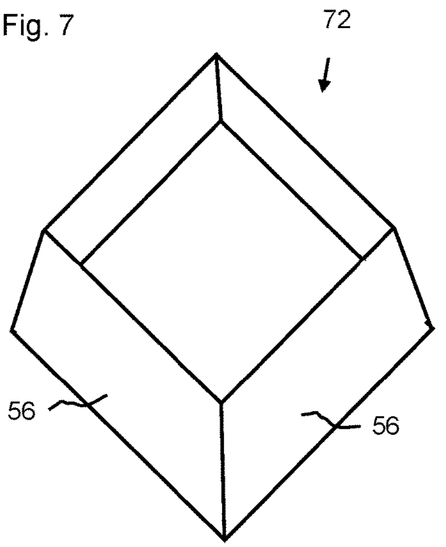
Figure 7A:
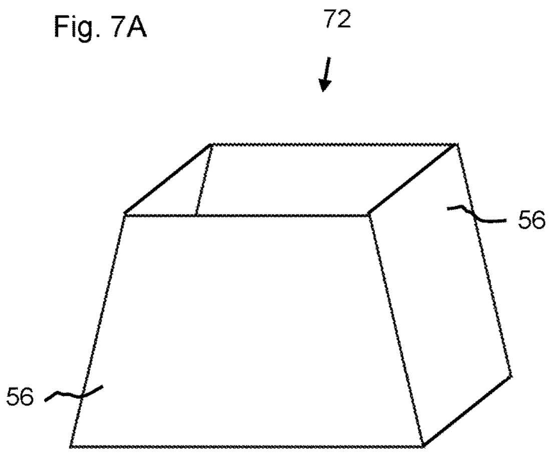

FIGS. 7 and 7A are top and isometric views of frame stabilizer 72 comprising a plurality of walls 56. Said walls may be slightly slanted making the stabilizer slightly narrower at the top and widens slightly to the bottom. Frame stabilizer may also have walls that are vertical, straight up and down with no slant. The stabilizer may come in various shapes and sizes, triangular, square, trapezoidal, rectangular, and round. The top and bottom of said frame stabilizer in this embodiment has a completely open top and completely open bottom.

Figure 7B:
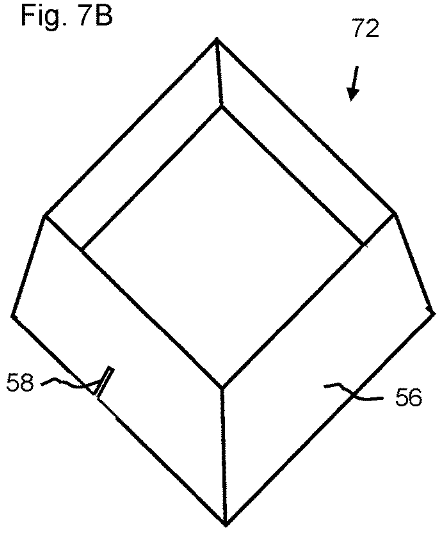

FIG. 7B is a top, isometric view of frame stabilizer 72 that comprising a cord slot 58 to enable a light cord to be accommodated with said frame stabilizer 72.

Figure 7C:
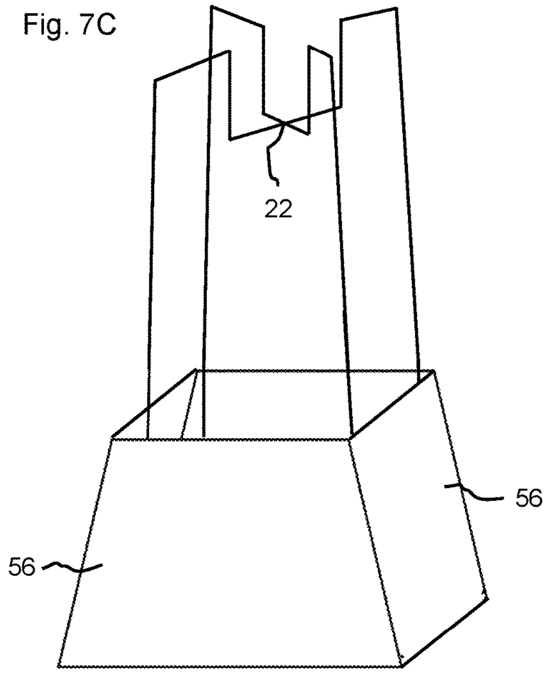

FIG. 7C is an isometric view of frame embodiment in use with frame stabilizer 72.

Figure 7D:
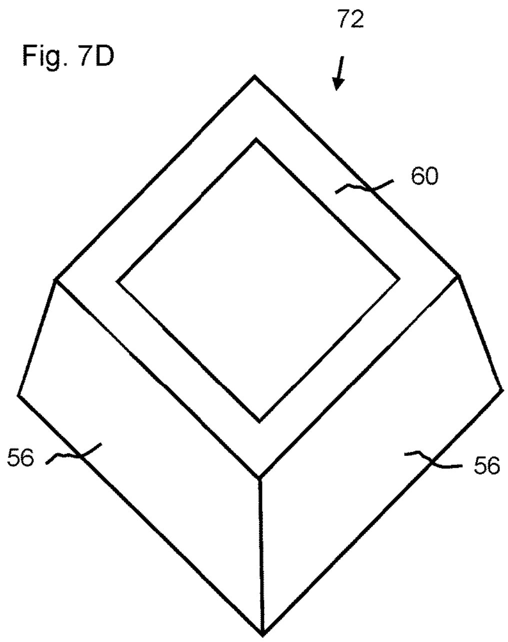
Figure 7E:
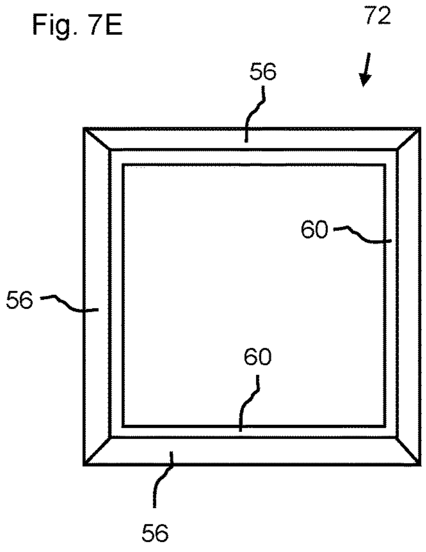

FIGS. 7D and 7E are top isometric and bottom views, respectively, of frame stabilizer 72 that comprise a wall beam 60 at the top of said frame stabilizer 72. Said wall beam may also line a location within or inside of said frame stabilizer 72. Frame stabilizer in FIGS. 7D and 7E may both also contain a cord slot 58 to contain light cord.

Figure 7F:
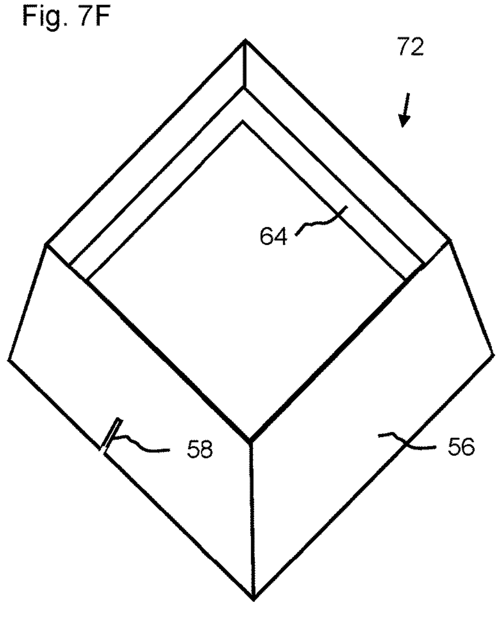
Figure 7G:
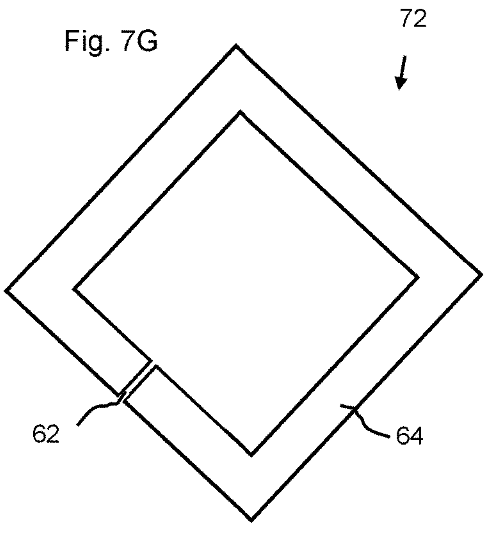

FIGS. 7F and 7G are top isometric and bottom views, respectively, of frame stabilizer 72 comprising foot hold 64 and open top. FIGS. 7F and 7G both also contain a cord slot 58 and foot hold cord slot 62, respectively, to contain light cord. Frame stabilizer in these figures and embodiment may or may not come with cord slot 58 and foot hold cord slot 62.

Figure 7H:
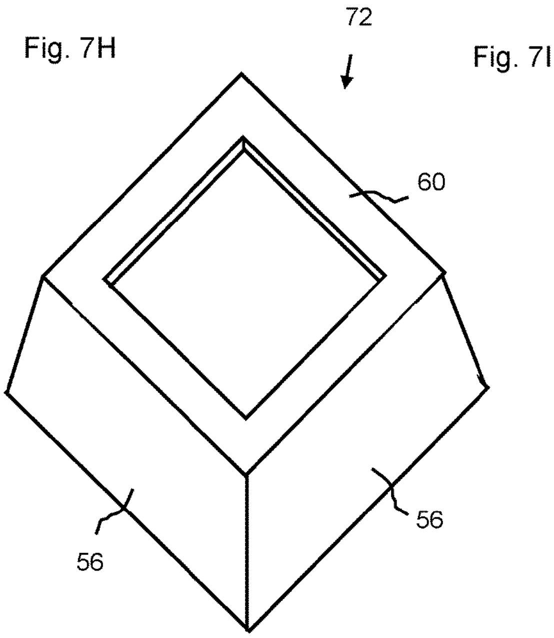
Figure 7I:
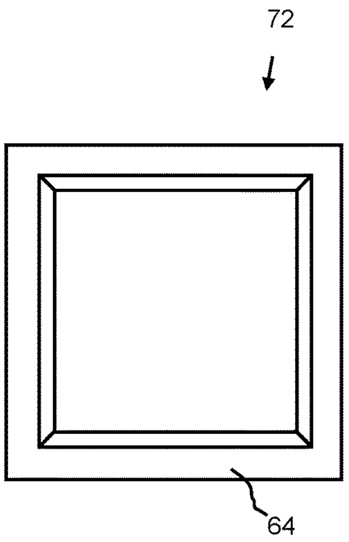

FIGS. 7H and 7I are top isometric and bottom views, respectively, of frame stabilizer 72 comprising foot hold 64 and wall beam 60.

Figure 7J:
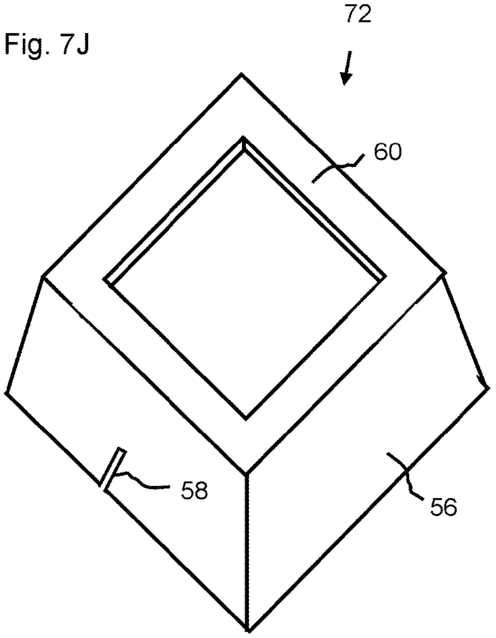
Figure 7K:
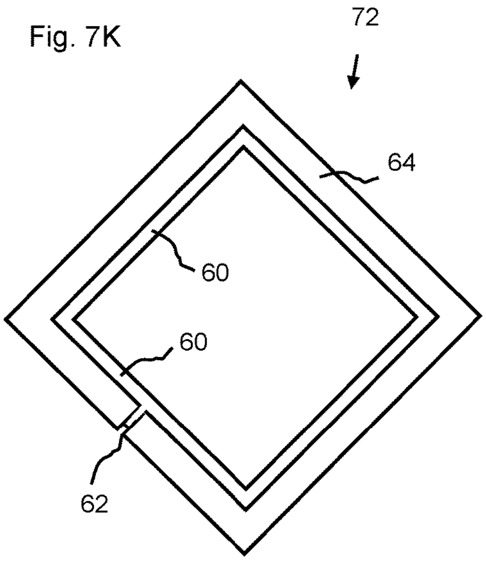

FIGS. 7J and 7K are top isometric and bottom views, respectively, of frame stabilizer 72 comprising foot hold 64, wall beam 60, cord slot 58, and foot hold cord slot 62 to contain light cord.

Figure 7L:
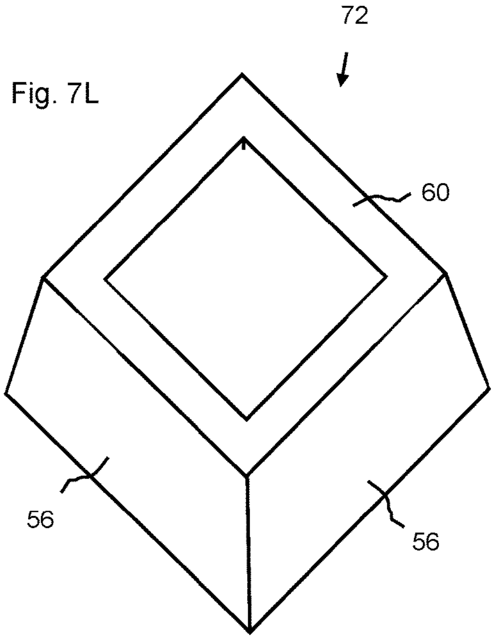
Figure 7M:
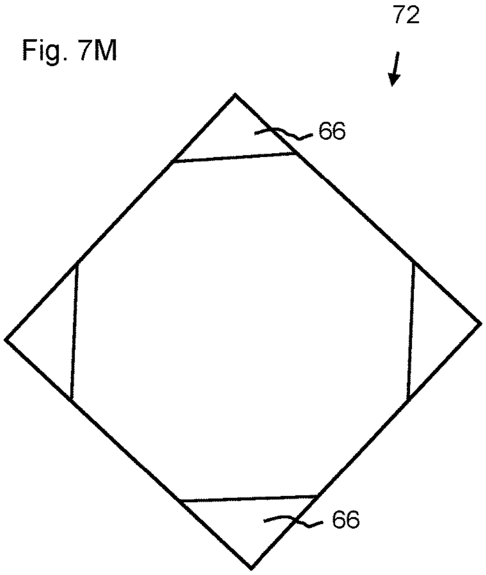

FIGS. 7L and 7M are top isometric and bottom views of frame stabilizer 72 comprising a plurality of walls 56, wall beam 60 and a plurality of foot hold tabs 66. Frame stabilizer in these figures and embodiment may or may not come with cord slot 58 and foot hold cord slot 62.

Figure 7N:
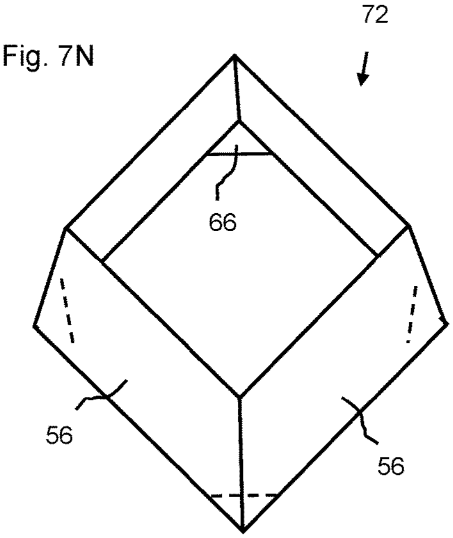
Figure 7O:
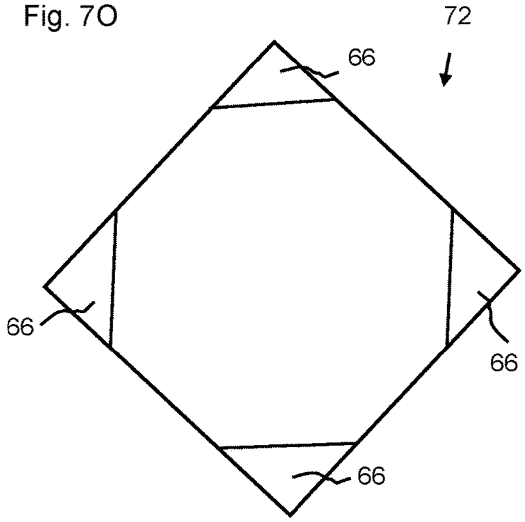

FIGS. 7N and 7O are top isometric and bottom views of frame stabilizer 72 comprising a plurality of walls 56, and a plurality of foot hold tabs 66. The top is completely open. Frame stabilizer in these figures and embodiment may or may not come with cord slot 58 and foot hold cord slot 62.

Figure 7P:
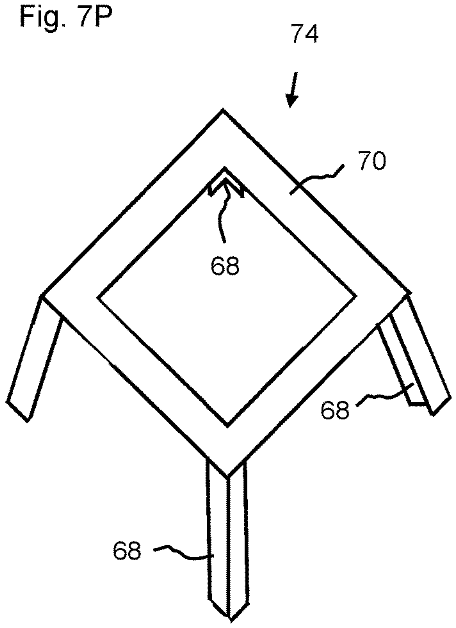
Figure 7Q:
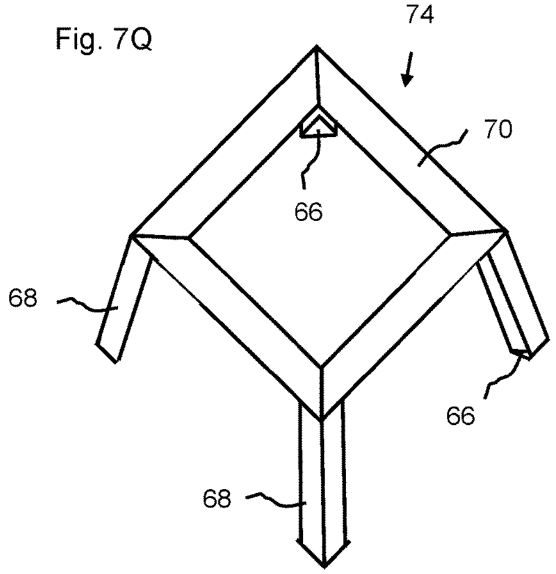

FIGS. 7P and 7Q are top isometric views of frame stabilizer 74. FIG. 7Q has a foot tab 66.

Figure 7R:
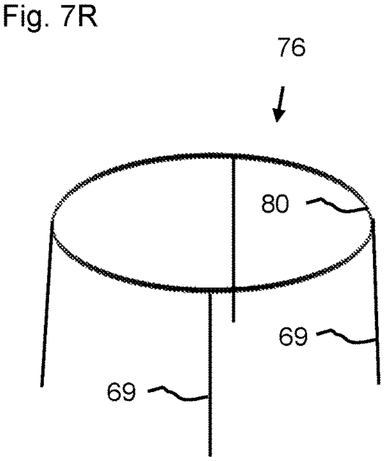
Figure 7S:
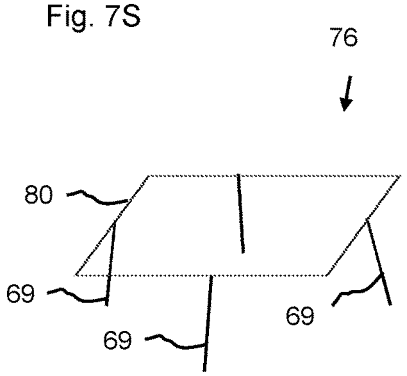
Figure 7T:
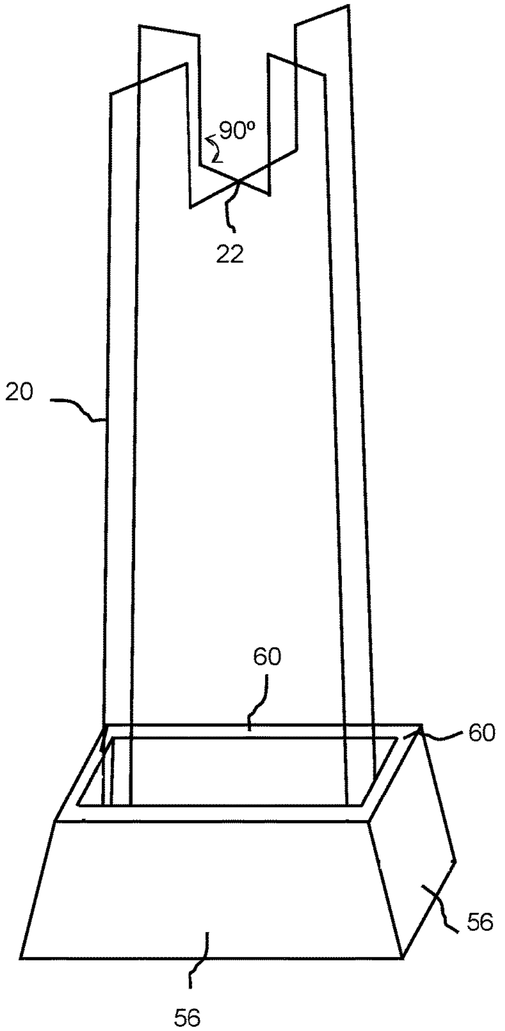
Figure 7U:
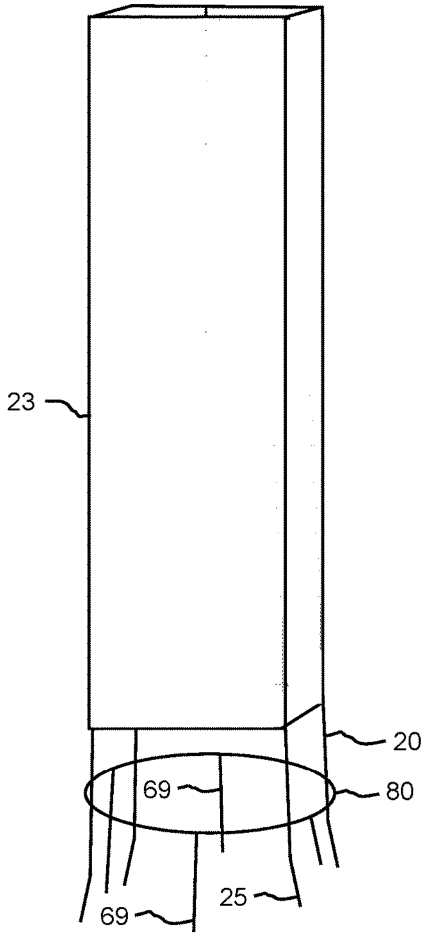

FIGS. 7R and 7S are isometric views of frame stabilizers 76 each comprising a stability belt 80, and a plurality of stabilizer legs 69. Said stabilizer legs 69 may be round, cylindrical, and solid. Stabilizer legs may be any shape that produces strong stable legs, including jagged, decorative, square, rectangular shaped, round, solid FIGS. 7T and 7U isometric views of frame embodiments in use with frame stabilizer 72, and frame stabilizer 76, respectively.

Figure 7V:
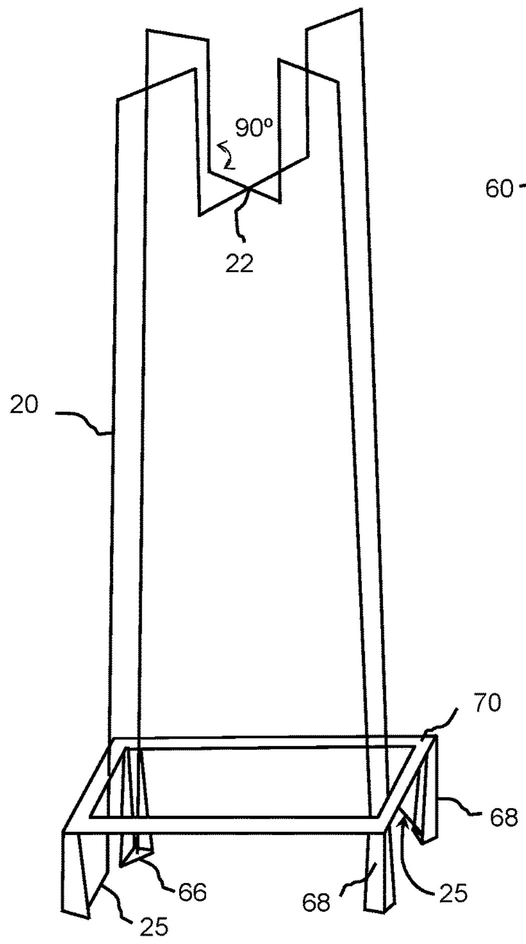
Figure 7W:
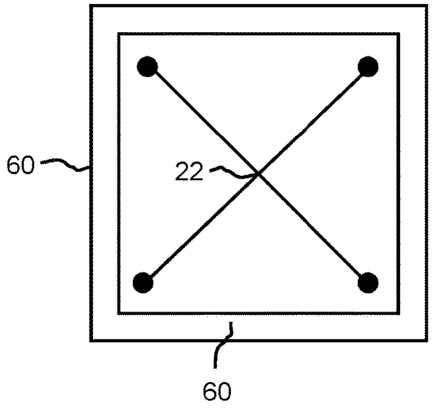
Figure 7X:
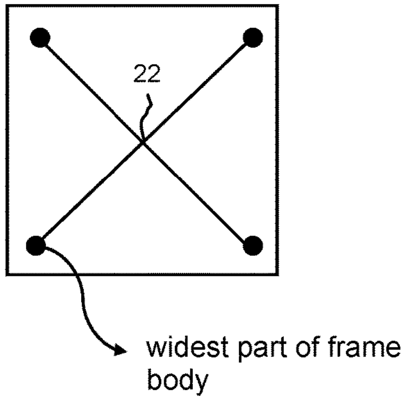
Figure 7Y:
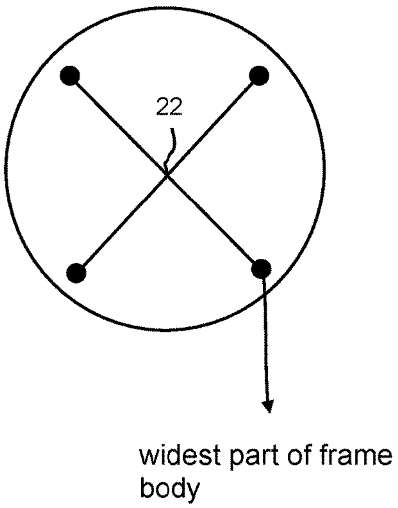

FIG. 7V is an isometric view of a frame stabilizer . . . .

FIGS. 7W-7Z are top views of frame embodiment, like frame in FIG. 7V, and frame stabilizers like frame stabilizers in FIGS. 7-7S, respectively. The views demonstrate the space between the widest part of the frame embodiment in respect to the frame stabilizers.

Figure 8:
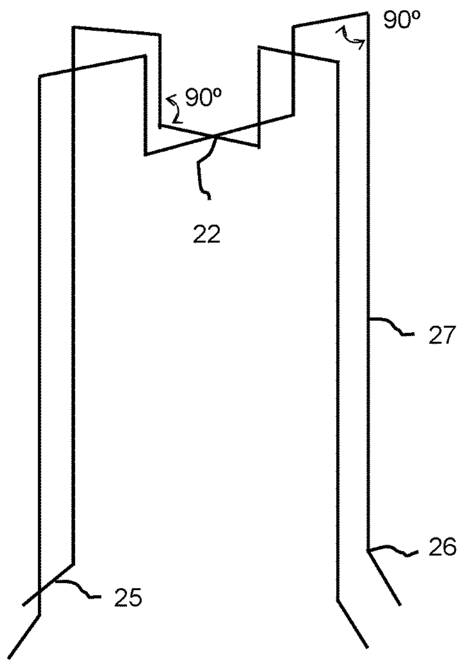

FIG. 8 is an isometric view of shortened frame embodiment that has straight vertical support legs 27 that does not have legs that are sloped or slanted.

Figure 8B:
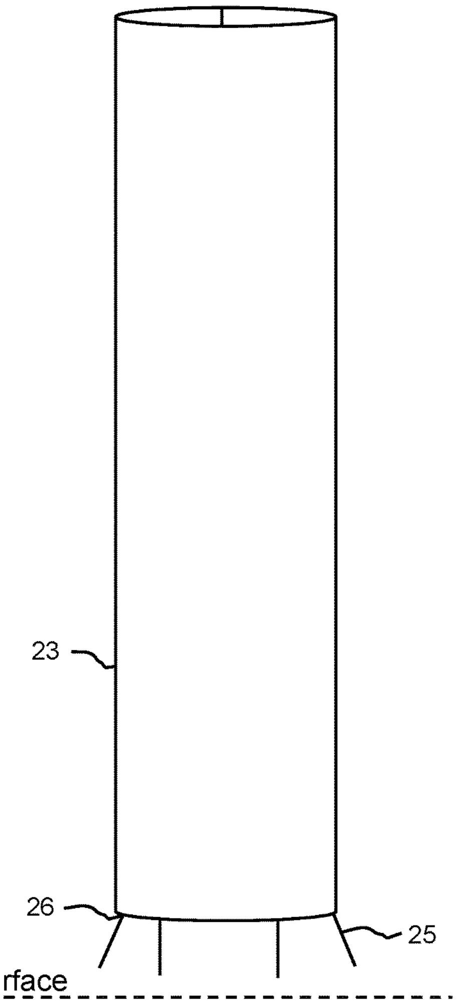
Figure 8A:
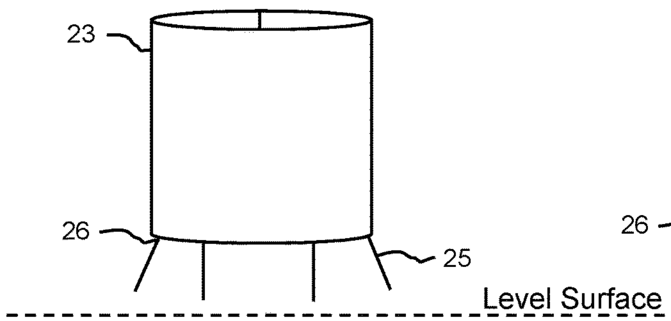

FIGS. 8A and 8B are isometric views of shortened frame embodiment that has straight vertical support legs 27 that does not have legs that are sloped or slanted, in use with wrap 23 that are substantially short and tall, respectively. FIGS. 8A and 8B are side by side to demonstrate the contrast between short wrap 23, and tall wrap 23, respectively on same said shortened frame embodiment.

Figure 9:
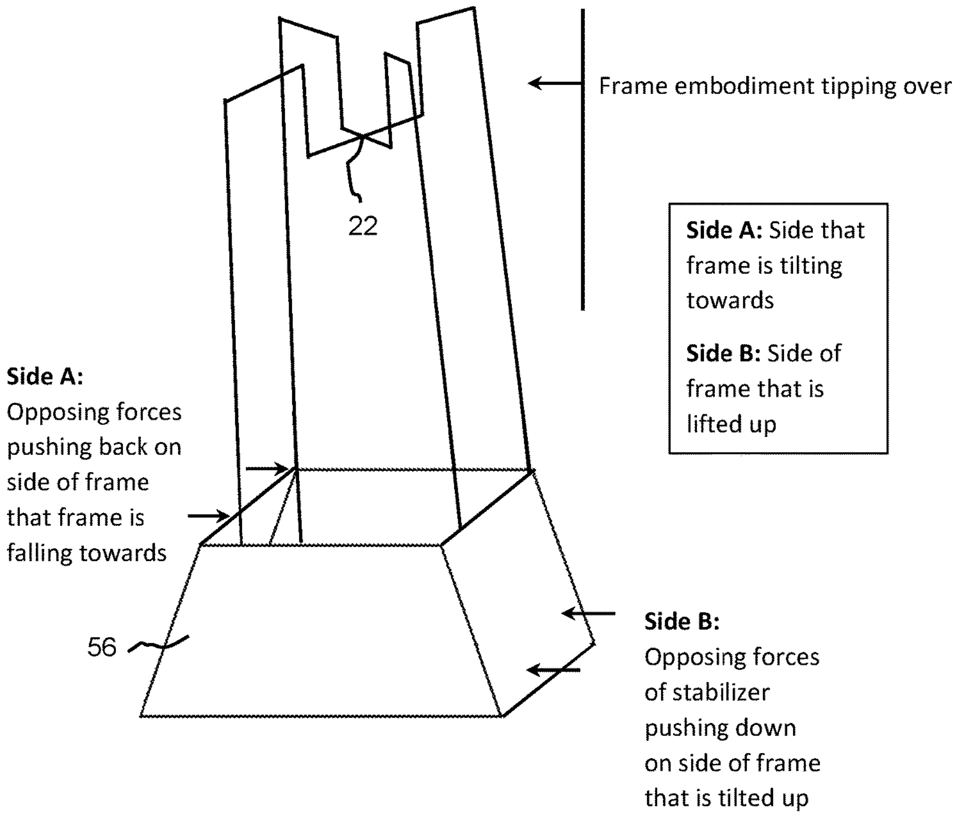

FIG. 9 is an isometric view of frame embodiment in use with frame stabilizer 72 in windy, breezy, or unstable conditions.

Figure 10:
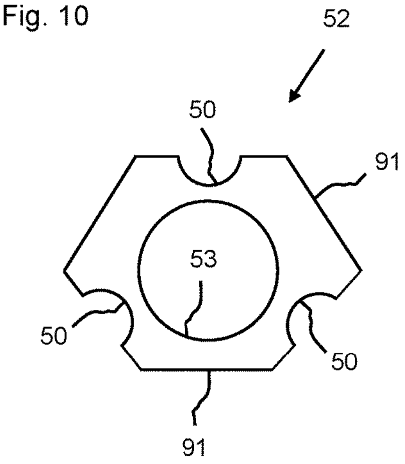

FIG. 10 is a top view of a fitted light that comprises three stem notches 50 to accommodate a frame embodiment that has three vertical support legs.

Figure 11:
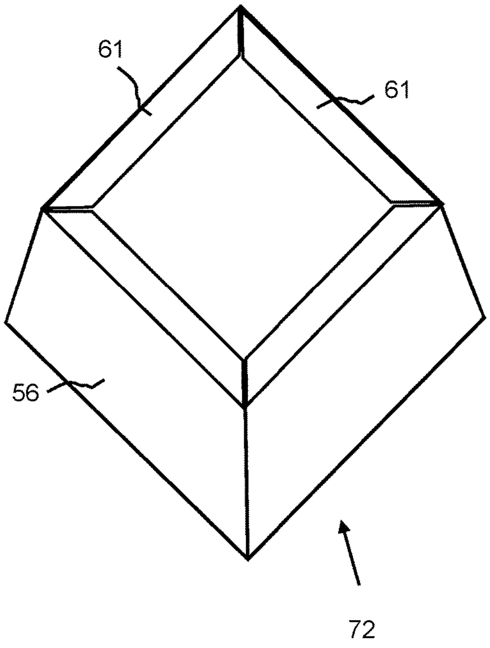

FIG. 11 is an isometric view of an alternate frame stabilizer 72.

Figure 12:
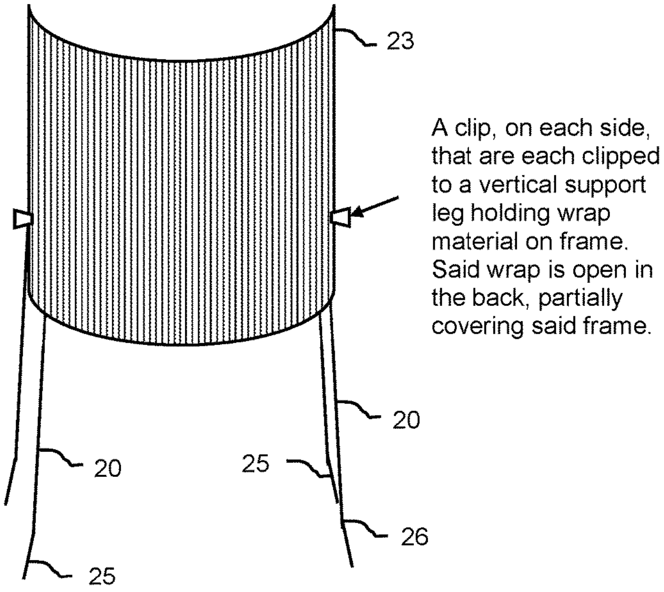

FIG. 12 is an isometric view of frame embodiment with wrap 23 clipped to the frame with metal clips.

Figure 13:
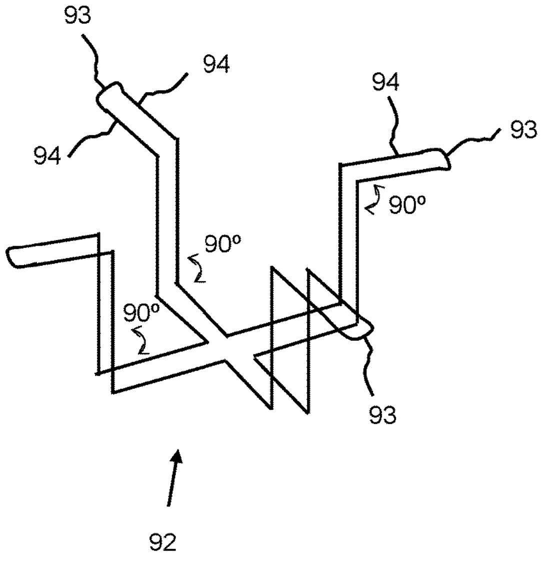

FIG. 13 is an isometric view of a stopper post 92 with a plurality of leg rests 93.

Figure 13A:
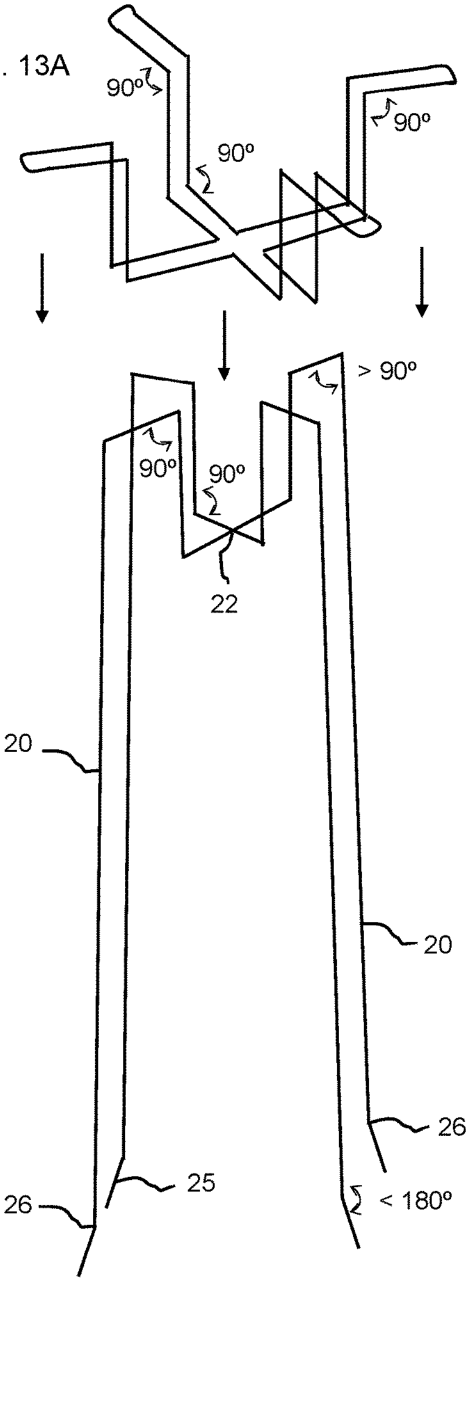

FIG. 13A is an isometric view of stopper post 92, being placed onto frame embodiment from the top.

Figure 14A:
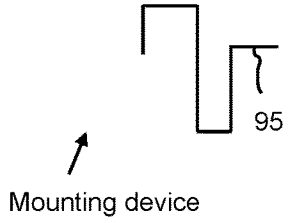
Figure 14B:
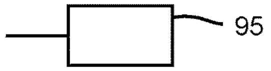

FIGS. 14A-14B are side and top views of a mounting device, and a mount and stake head 95, respectively.

Figure 14C:
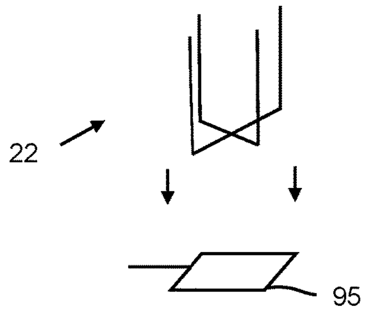

FIG. 14C is an isometric view of post 22 being inserted into a mount and stake head 95.

Figure 14D:
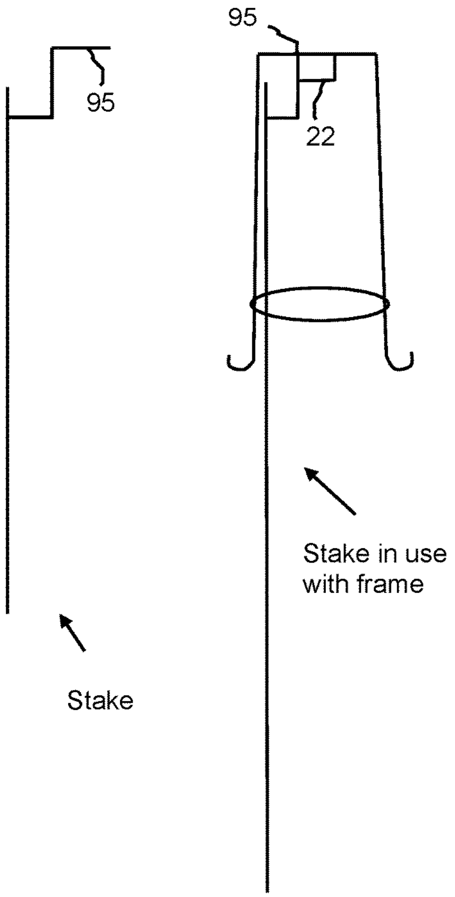

FIG. 14D are side views of a stake, and a view of a stake in use with said frame, respectively.

DRAWINGS—REFERENCE NUMERALS

20 vertical support legs
21 base
22 post

23 wrap material
25 foot
26 ankle
27 vertical support legs
30 stopper
31 removable tea light holder
32 tea light holder
33 horizontal support
34 contoured stopper
35 light holder hook
36 removable light holder
37 light holder arm
38 leg loop
40 hook point
42 angled arm
44 adjustable contoured stopper
46 anchor
47 anchor hole
48 anchor plate
49 fitted light
50 stem notch
51 fitted light
52 fitted light
53 light opening
54 cord slot
56 wall
58 cord slot
60 wall beam
61 pitched wall beam
62 foot hold cord slot
64 foot hold
66 foot hold tab
68 stabilizer leg
69 stabilizer leg
70 top beam
72 frame stabilizer
74 frame stabilizer
76 frame stabilizer
80 stability belt
90 notch
91 flush edge
92 stopper post
93 leg rest
94 double stems
95 mount and stake head

DETAILED DESCRIPTION—FIGS. 1-4G—FIRST EMBODIMENT

Figure 1:
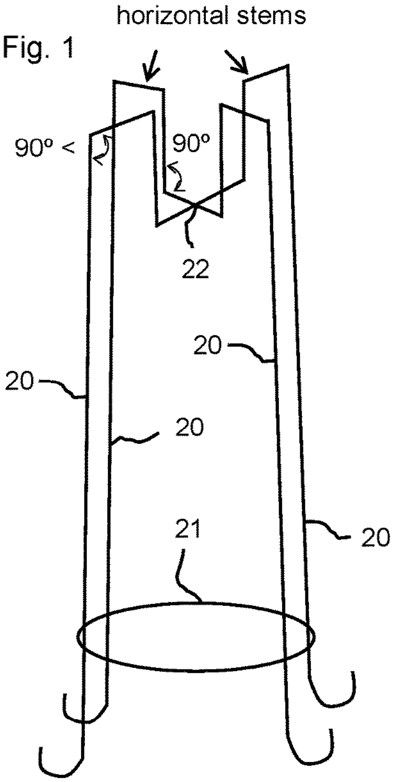
FIG. 1 is an isometric view of a frame embodiment that is used to create and display handmade paper crafts, centerpieces, or handmade paper lanterns.

FIG. 1 is an isometric view of a frame embodiment that is used to create and display handmade paper centerpieces or handmade paper lanterns. The frame is a self-standing and self-supported frame made of rigid metal wire that is welded together to form the frame. Although metal and/or metal wire is most desirable to use, any material that will produce similar results such as wood, plastic, glass etc., may also be suitable. The frame has a plurality of vertical and horizontal support members. Frame in FIG. 1 contains a plurality of horizontal and vertical members at the top of the frame that intersect to form an open enclosure, a post 22, as seen in FIG. 1. Post 22 doubles as a tea light holder and a stake and/or mounting post. It is elongated in the center of the frame to balance the frame when placed on a stake or mounting device. Vertical support leg 20 can be formed by bending wire to the desired shape. Hence, the vertical support leg 20 may comprise of varying lengths and has a bend at the top that forms a horizontal portion or stem that is substantially horizontal. Each vertical support leg 20 has a slight slope where the angle between the vertical support leg 20 and the horizontal stem that it bends in to is slightly greater than 90°. Although vertical support legs with a slope angle that is greater than 90° but 120° or less, is adequate to obtain reasonable results to elevate wrap 23, an angle greater than 90 but 112° or less is most ideal because the slighter the slope or angle, as seen in FIG. 1, the more points of elevation there are along vertical support legs 20, and the more stable said wrap is on said frame. Additionally, the slighter the slope of said frame, the more the wrap 23 can grip said vertical support members or legs and is more stable on said frame. The horizontal stem extends inwardly towards the center of said frame and then bends downward vertically, forming a vertical portion of post 22 and then the vertical portion then bends into a horizontal direction, again, inwardly towards the center of said frame. Each vertical support leg 20, spaced at equal intervals apart, are then connected by welding each end of the horizontal stem portion to each other, forming post 22 in the center. This keeps the tea light from shifting or falling out of the post. Post 22 enables frame embodiment to be mounted or staked with or without the use of a tea light. Although FIG. 1 demonstrates said frame with 4 vertical support legs 20, the plurality of vertical support legs may comprise three, four, five or six vertical support legs to form said frame, where the legs are connected to each other to form the body of a frame that is slightly narrower at the top, and widens gradually from the top, downward. Said frame is an open skeletal frame that comprise of vertical support legs that enable the frame to stand on its own. Said legs have a smooth round surface like metal wire. Additionally, said frame may also be made of extremely thin, rigid metal wire to make the wrap 23 appear as if it is floating in the air. Because the vertical support legs 20 are so thin, it may appear from a short distance that the wrap 23 or lantern is suspended in the air. For extremely thin wire that creates the illusion of floating lanterns or paper crafts, the thickness of vertical support legs 20 may be 0.075 inches and below, although 0.05 inches and below is most preferable.

Figure 1A:
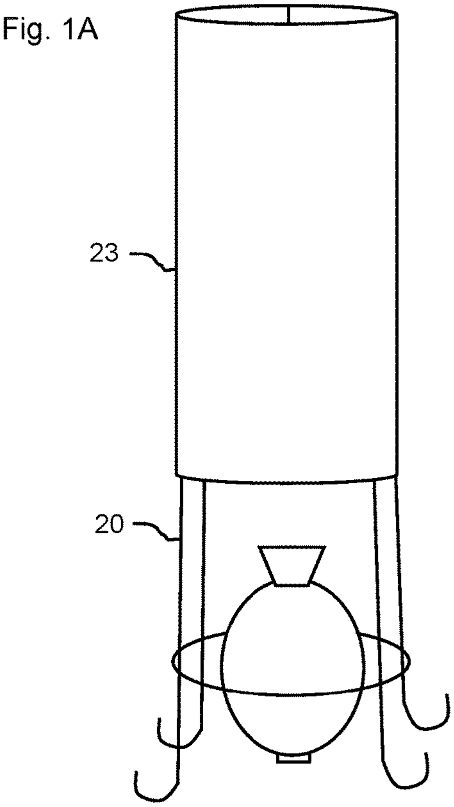
FIG. 1A is an isometric view of frame embodiment in FIG. 1 with wrap 23 elevated on said frame, at a particular elevation point above a vase.
Figure 1B:
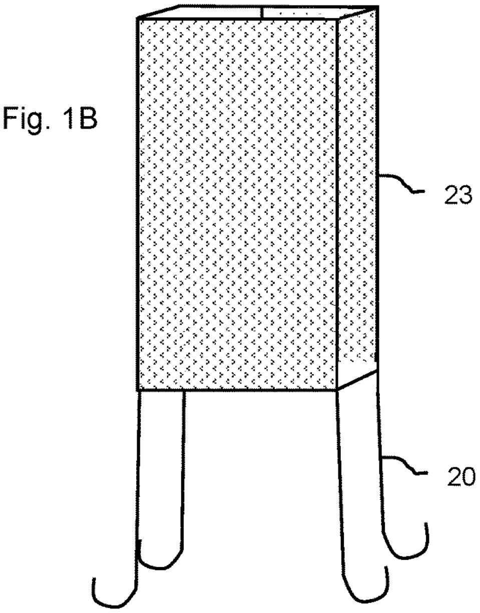
FIG. 1B is an isometric view of frame embodiment with wrap 23 that has been creased to make a rectangular shaped wrap 23, elevated on said frame.

FIG. 1A is an isometric view of frame embodiment that has a shade that is elevated on said frame above a vase. The wrap 23 may comprise of paper, sheet metal, plastic, wire, fabric that has a stiff quality, secured at various elevations on the frame, in use with various sized vases.

FIG. 1B is an isometric view of a frame embodiment that demonstrates wrap 23 with creased edges, to make a rectangular shaped wrap 23, and is elevated on said frame. The wrap 23 is elevated by the difference in diameters of said increasing first diameter of said frame and second diameter of said wrap 23 tightened on said frame and the friction that restrict vertical movement or slippage. The frame having an increasing first diameter or width so that said frame gradually extends outward from the top of the frame, wherein said frame is slightly smaller at the top; said frame comprises a plurality of elevation points or locations along said vertical supports. A stiff wrap 23 having a second diameter or width, so that said stiff wrap 23 is supported at various elevation points or locations on the frame by said increasing first diameter or width of said frame, due to the difference in the first and second diameters or widths, limiting vertical movement or slippage of the wrap 23 beyond said preferred elevation points or locations.

Said wrap 23 may comprise of any stiff material that can be wrapped and/or creased, and secured around said frame. In the case of sheet metal that is thick, the sheet metal can be bent to crease its edges. Sheet metal may be die cut or laser cut for decorative features, or for light to shine through when using with light. Sheet metal may be used on said frame in same manner as paper, stiff fabric, thin pliable plastic, wire, etc., by wrapping, creasing, and tightening the bottom half of wrap 23 around vertical support members or vertical support legs 20, at elevation point, securing it and then fastening to elevate at desired level. For decorative purposes, the wrap 23 may be fastened at the top.

Figure 1C:
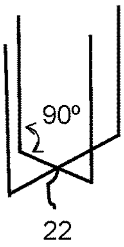
FIG. 1C is an isometric view of a post 22 that is used to house a tea light and also functions as a mounting or staking post.

FIG. 1C is an isometric view of a post 22 that is used to house a tea light and may also function as a mounting or staking post. Post 22 comprises of a plurality of stems that form an open enclosure just big enough to contain a tea light. The stems are "L" shaped and can comprise of three, four, five or more stems. Each stem comprises a horizontal portion that is perpendicular to the vertical portion. The horizontal portions of the "L" shaped stem are connected at the center at equally spaced intervals. This keeps the tea light from shifting too much and from falling out of the post. Post 22 enables frame embodiment to be mounted or staked with or without the use of a tea light. Said post is an open enclosure that enables light to pass through without obstruction, whether the light has a thin, short body or thick, tall body. A tea light, LED tealight, or any LED light, that can fit securely in said post, can be used.

Figure 2:
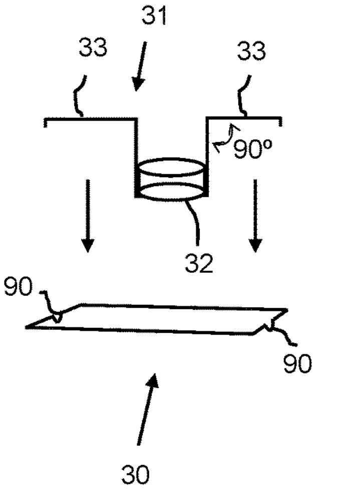
FIG. 2 is an exploded view of stopper 30 and removable tea light holder 31.

FIG. 2 is an exploded view of stopper 30 and removable tea light holder 31. Stopper 30 may vary in inner diameter. It has a plurality of stems that are welded together at right angles to form a square or rectangular shaped stopper 30, that has an open center that fits over said frame embodiment. Stopper 30 also has a plurality of foo that are used to contain tea light holder 31, to keep it from shifting. Said notch 90 is a small dip, along two or more horizontal stems, and is located near or in the center of said stopper 30 horizontal stem. Tea light holder 31 has horizontal supports that enable it to rest on stopper 30, inside of notch 90, in a perpendicular manner. Notch 90 has a concave shape, and is wide and deep enough to contain horizontal stem from tea light holder 31. The preferred material for stopper 30 and tea light holder 31 is a strong but thin metal wire; however, any suitable material such as plastic, wood, etc., that produces similar results will do.

Figure 2A:
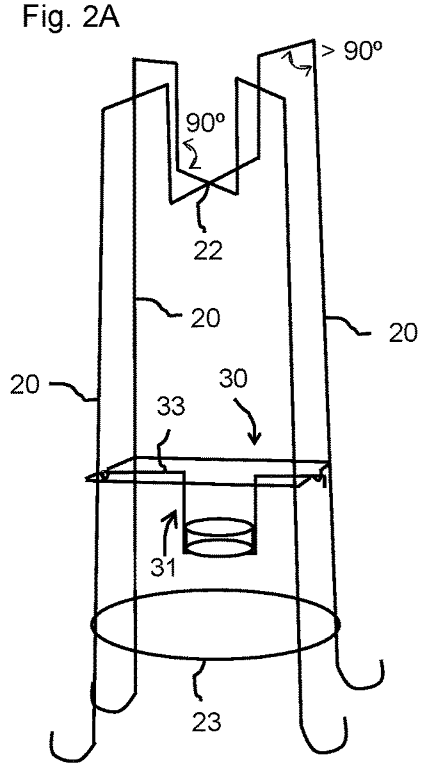
FIG. 2A is an isometric view of frame embodiment, and stopper 30 with removable tea light holder assembly 31 as they would be used together, that will enable a tea light to be used at a lower level below the top within said frame.

FIG. 2A is an isometric view of frame embodiment, and stopper 30 with removable tea light holder 31 as they would be used together, that will enable a tea light or LED light to be used at a lower level below the top of said frame, within the frame. As seen in FIG. 2A, stopper 30 fits over the frame body, and tea light holder 31 fits inside of said frame suspended by a pair of notch 90, to hold tea light or LED tea light.

Figure 2B:
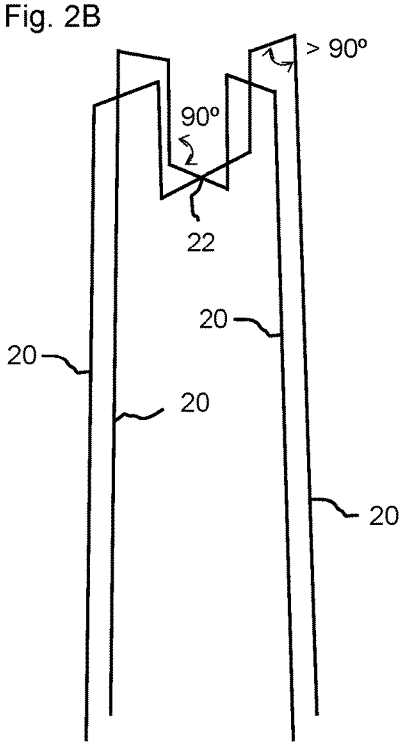
FIG. 2B is an isometric view of frame embodiment that can be staked in the ground by vertical supports that have no feet

FIG. 2B is an isometric view of frame embodiment that can be staked in the ground by vertical supports legs that have a slight slope from top to bottom, that can be pushed or staked into the ground. Said frame can be tall or short and made of thick or thin metal wire material. Additionally, said frame may also be made of extremely thin, rigid metal wire to make the wrap 23 appear as if it is floating in the air. Because the vertical support legs 20 are so thin, it may appear from a short distance that the wrap 23 or lantern is suspended or is floating in the air. Although metal wire is preferable, any material that produces similar results such as plastic, metal, or wood is sufficient. For extremely thin wire that creates the illusion of floating lanterns or paper crafts, the thickness of vertical support legs 20 or 27 may be 0.075 inches and below, although 0.05 inches and below is most preferable.

FIGS. 3 and 3A are top and isometric views, respectively, of contoured stopper 34 that has a contoured shape that is configured to fit over said frame embodiment and be elevated by each point on vertical support leg 20 where each leg loop 38 is stopped by a friction between the width of said frame embodiment, and the inner width of said stopper 34 and the size of said leg loops 38. Said contoured stopper 34 has a plurality of leg loops 38 that are just big enough to fit around each vertical support legs 20, respectively, of frame embodiment. Said contoured stopper 34 is a one piece horizontal component that is made of a thin rigid metal wire. The metal wire may also be somewhat flexible. Contoured stopper 34 comprises a plurality of angled arms 42 that go inwardly towards center of said frame so that when the frame or said lantern is lit, the arms are not as visible as they would be if they were connected at right angles, like a square. A square or rectangular stopper would make said stopper more easily seen, behind said wrap 23. FIG. 3A is an isometric view of contoured stopper 34. Angled arms 42 of contoured stopper 34 also go inwardly to create a "v" shaped hook point 40, to keep removable tea light holder 36 from sliding around or off.

FIG. 3B is an isometric view of removable light holder 36. Removable light holder 36 is used along with contoured stopper 34 to hold a tea light, LED light, or LED tea light. Removable light holder 36 is made somewhat similarly to post 22. It is an open enclosure that comprise of a plurality of stems, each stem comprised of vertical and horizontal parts. The stems are somewhat "Z" shaped, except that the middle vertical portion of the stem is formed at a 90° angle to each of the horizontal portions of the stem. The bottom horizontal portions meet in the center at equally spaced intervals to form the open enclosure. There is a plurality of light holder arms 37 at the top and are horizontal, and each comprise of a plurality light holder hooks 35 that keep removable light holder 36 from sliding off contoured stopper 34. The light holder hooks 35 are vertical nubs that fit over and on the outside of hook point 40. There may be three to five light holder hooks that correspond to the number of hook points 40, three to five, there are.

FIG. 3C is an exploded view of removable light holder 36 in use with contoured stopper 34. This figure demonstrates how removable light holder 36 fits onto contoured stopper 34. The horizontal stems at the top of said removable light holder 36 hooks onto hook point 40 of said contoured stopper 34, to suspend it within said frame. FIG. 3D is an exploded view of contoured stopper 34 and frame embodiment, demonstrating how contoured stopper 34 slides onto said frame embodiment from the top. FIG. 3E is an isometric view of frame embodiment in use with contoured stopper 34. FIG. 3F is an isometric view of frame embodiment in use with contoured stopper 34 showing how removable light holder 36 would be placed onto contoured stopper 34. FIG. 3G is an isometric view of frame embodiment in use with contoured stopper 34 and removable tea light holder 36.

FIGS. 4 and 4A are top and isometric views of adjustable contoured stopper 44. FIG. 4 demonstrates anchor 46 being plugged into anchor plate 48. FIG. 4A is an isometric view of adjustable stopper 44 demonstrating when anchor 46 is not plugged into anchor plate 48. FIG. 4B is a top view of adjustable contoured stopper 44 when anchors 46 are not plugged into anchor plates 48. Adjustable contoured stopper 44 are two pieces that fit together to become one piece like contoured stopper 34; as seen in FIGS. 3-3A; except that adjustable contoured stopper 44 is adjustable. Adjustable contoured stopper 44 is made of a thin rigid, but somewhat flexible material comprised of metal wire, although any material that produces similar results will do, such as plastic, metal, wood, etc. Said adjustable contoured stopper 44 may have one or two anchor plates 48 that comprise of a plurality of anchor holes that anchor 46 plugs into. Anchor plate 48 is thin, flat, and rigid and is attached to the end of an angled arm 42. The farther away an anchor hole is from the anchor 46, the tighter on said frame the adjustable contoured stopper 44 would be. FIG. 4C is an isometric view of removable light holder 36 that comprise of four light holder arms 37, each comprising a light holder hook 35. FIG. 4D is an isometric view of adjustable contoured stopper 44 demonstrating how it would be placed onto frame embodiment. FIG. 4E is an isometric view of frame embodiment in use with adjustable contoured stopper 44. FIG. 4F is an isometric view of frame embodiment and adjustable contoured stopper 44 demonstrating how removable light holder 36 would be placed on said stopper 44. FIG. 4G is an isometric view of frame embodiment in use with adjustable contoured stopper 44 and removable light holder 36.

Operation—FIGS. 1-4G

In operation, one uses the frame embodiment in FIG. 1 as a support to contain and display handmade paper lanterns, comprising primarily of paper, stiff or stiffened fabric, light flexible sheet metal, plastic, or any other desired material that produces similar results; however, it can also be used to create a variety of crafts such as a lamp, wind chime, night light, etc., using various materials such as wire, cloth, paper, sheet metal, etc. The frame is designed to fit and accommodate standard scrapbook paper sizes, which come in 12"×12" and 8.5"×11", with minimal accommodations. Custom cut paper of various sizes may also be used. After forming and fastening the paper into a cylindrical shape, as with staples, metal clips, adhesive glue dots, etc., the paper is then slid onto the frame from the top and pulled down over it to the level desired. Depending on the inner diameter of the cylinder formed paper, the paper can be elevated at any point on the frame, high or low. Vertical support legs 20 are sloped from top to bottom, almost barely noticeable, making the frame slightly narrower at the top, and widens, slightly, on downward. The slight slope creates a resistance that enables paper or similar material to be elevated, fastened, and secured at any location along the frame without any additional accommodations. The slighter the slope, the more points of elevation there are along the frame's vertical supports 20. Without the slope, the paper could easily slide down the frame below preferred location, with little or no resistance due to gravity. When paper or similar material is tightened around vertical support legs 20, the resistance created by the slope prohibits the paper from sliding down the frame due to gravity, lightly pulling or tugging, or when added embellishments are heavier than the wrap 23.

With this frame embodiment, various shapes can be formed with the wrap. For a cylindrical shape, the wrap 23 is formed into a cylinder, fastened temporarily with metal clips, and then pulled down over the frame until friction, caused by the slight slope, stops it. Said slight slope is formed by the gradual widening of said frame from the top, making the frame slightly narrower at the top. The slighter the slope, the more points of elevation there are. The clips can be adjusted to tighten or loosen the wrap on the frame, until the desired elevation is reached. For a rectangular shape, like in FIG. 1B, the cylinder formed wrap 23 is pulled down over the frame, and then creased by pinching the edges along each vertical support leg 20, while it is on the frame. This will crease the bottom half of the wrap 23. The paper is then flipped, slid down onto the frame, and creases are repeated for the other half of the wrap. Smaller wrap sizes may be secured on the frame using clips or rubber bands to secure the wrap to the frame. This embodiment may also accommodate endless possibilities and any other shapes that are conceived, such as a miniature hut, mini dollhouse, etc.

When the diameter of the cylinder formed from wrap 23 is slightly larger than the bottom of frame embodiment in FIG. 1, the wrap will rest on base 21, creating an alternate effect that may be desired. Base 21 extends beyond the width of the frame in FIG. 1. Base 21 elevates the bottom of the wrap or similar material above the feet of the frame and keeps the wrap from sliding off the frame. The frame in FIG. 1 may come in varies sizes and widths from tall to short, and medium to narrow and may be constructed out of any suitable material that will produce a sturdy or rigid frame. Although metal and/or metal wire are most desirable to use, any material that will produce similar results such as metal, wood, plastic, etc. may also be suitable. The frame in FIG. 1 contains a post 22 that will enable it to be mounted on a wall or wooden fence, elevated on a stake, suspended or hung. Post 22 is a multi-functional post that also functions as an enclosure to contain a lamp socket or a tea light.

FIGS. 1A-1B, 5F-5G, 7U, and 8A-8B demonstrate how wrap 23, comprising any of paper, pliable sheet metal, pliable plastic, fabric that is somewhat stiff or has been stiffened, or any product that is stiff and can be wrapped around said frame, and produce similar results, on said frame. The wrap 23 used for any of said frame embodiments comprises of paper, or any material that produces similar results such as sheet metal, metal, plastic, fabric, or stiffened fabric, etc. Wrap 23 is then tightened around vertical support legs 20 at desired level and is fastened and secured and said wrap 23 stands erect on said frame embodiment, and said top of wrap 23 sits above the top of the frame. Any material that has a stiffness to it can be used as wrap 23 for the frame.

FIG. 2 is an exploded view of stopper 30 and removable tea light holder 31. FIG. 2A is an isometric view of frame embodiment, while in use with stopper 30 and removable tea light holder 31. The figure demonstrates a removable light holder assembly that enables a tea light or LED light to be placed at various elevations on said frame. Stopper 30 may vary in inner diameter. It has a plurality of stems that are connected and welded together at right angles to form a horizontal component, stopper 30. It also has a notch 90 that are used to contain removable tea light holder 31 to keep it from shifting. Removable tea light holder 31 has horizontal supports 33 that enable it to rest on stopper 30, inside of stem notches 90, in a perpendicular manner. The preferred material for stopper 30 and removable tea light holder assembly 31 is strong but thin metal wire. However, any suitable material that produces similar results will do such as metal, plastic, wood, metal, etc. This embodiment enables the use of a tea light at various locations on the frame, other than in lantern post. Stopper 30 slides down over the frame, until it is stopped by the resistance created by the difference in the its inner diameter and the width of said frame. The difference in the inner diameter or width of stopper 30 and the outer diameter or width of frame, enables stopper 30 to be elevated at a particular point on said frame. Stopper 30 provides a location on the frame that the tea light will be elevated. Stopper 30 may come in a variety of shapes and sizes. Removable tea light holder 31 is then placed onto stopper 30 perpendicularly, as demonstrated in FIGS. 2 and 2A. Stopper 30 has a plurality of horizontal stems that connect at right angles to form a square having a smooth surface. The horizontal stems may also be connected to form a rectangle, circle, triangle, hexagon, pentagon, or any shape to fit around corresponding frame snugly, form fitted, and elevated at some point on said frame. If the frame is moved or shifted, the removable tea light holder 31 may pivot in notch 90, keeping the tea light upright and from spilling or tipping out when said frame is being moved, etc.

FIG. 3 is a top view of contoured stopper 34. FIG. 3A is an isometric view of contoured stopper 34. Said stopper enables a light or tea light to be elevated or lowered at a particular point on said frame. The stopper may come in various sizes, each having a different inner diameter. Each different diameter enables said contoured stopper 34 to be elevated at a different point on said frame. Said stopper is placed over and onto said frame from the top, and rests on said vertical support legs 20, when it is stopped by the increased outer diameter or width of said frame, and the inner diameter or width of said contoured stopper 34; as seen in FIGS. 3 and 3A. Said stopper has a cylindrical smooth surface, and an open center that fits the outer diameter of said frame. Although said contoured stopper 34 is preferably made of a very thin rigid metal wire form, any suitable material that produces similar results will do, such as plastic, wood, metal, etc. Contoured stopper 34 comprises a plurality of leg loops 38 that fit snugly around each vertical support leg of said frame. Depending on the number of vertical support legs 20 on said frame, there will be a corresponding number of leg loops 38. Because the contoured stopper 34 is thin, it enables it to fit almost undetected under wrap 23, comprising paper, fabric, sheet metal, etc. Leg loop 38 is laterally connected to angled arm 42. Said angled arm 42 goes slightly outward from said loop and meets the opposite angled arm 42 in center at hook point 40. Contoured stopper 34 would be placed under said wrap 23, when placed on said frame. While on said frame, angled arm 42 goes inwardly toward the center or said frame, meeting at hook point 40. The angled arm 42 is angled inwardly towards the center of said frame in order that lines are not visible behind wrap 23 when illuminated with light. Hook point 40 is the point where the light holder hook 35 of removable light holder 36, hooks on to said hook point 40 of contoured stopper 34 so that the removable light holder 36 can be suspended inside of said frame.

FIGS. 3B-3G are various isometric views of contoured stopper 34, removable stopper 36, and contoured stopper 34 and removable stopper 36 in use together with said frame embodiment, respectively. FIG. 3B illustrates removable light holder 36 which comprise a plurality of light holder hook 35 that are vertical nubs that are perpendicularly connected to light holder arm 37. The role of the light holder hook 35 is to be placed over and onto hook point 40, as seen in FIG. 3C. FIG. 3C is an exploded view of removable light holder 36 in use with contoured stopper 34. This figure demonstrates how removable light holder 36 fits onto contoured stopper 34. The horizontal stems at the top of said removable light holder 36 are each a light holder arm 37 that hold up and suspend said removable light holder 36, while hook point 40 keeps it in place. FIG. 3D is an exploded view of contoured stopper 34 and frame embodiment, demonstrating how contoured stopper 34 slides onto said frame embodiment from the top. FIG. 3E is an isometric view of frame embodiment in use with contoured stopper 34. FIG. 3F is an isometric view of frame embodiment in use with contoured stopper 34 showing how removable light holder 36 would be placed onto contoured stopper 34. FIG. 3G is an isometric view of frame embodiment in use with contoured stopper 34 and removable tea light holder 36.

Wrap 23 may comprise of any material that will hold its form, such as being erect on said frame. Said wrap 23 may be naturally stiff, or stiffened by any product or method and comprises of paper, fabric, pliable plastic or metal, wire, sheet metal etc. The sheet metal may or may not have laser cut designs or cut-outs to reveal light or for design. When wrap 23 is placed on said frame, the user may want to place the light in the location more suitable to the placement of wrap 23. In this case, it is desirable to have an adjustable component that is strong and light weight and not be too bulky. It is most desirable to not have too many parts that are visible or cast a shadow on the wrap 23 when light is being used. In this case, adjustable contoured stopper 44, in FIGS. 4-4B accomplishes this.

FIGS. 4-4D illustrate an alternative contoured stopper that is adjustable. The adjustable contoured stopper 44, enables the stopper to be elevated or lowered to a variety of elevation points on said frame embodiment. Additionally, the components of adjustable contoured stopper 44 are mostly horizontal, going toward the center of the frame, reducing shadows and lines that would be visible behind wrap 23, when light is used. As seen in FIG. 4D, said adjustable contoured stopper 44 is placed over and onto said frame from the top, and rests on said vertical support legs 20 at the level where it is stopped by the increased outer diameter or width of said frame, and the inner diameter or inner width of said adjustable contoured stopper 44. Said adjustable contoured stopper 44 has a cylindrical smooth surface, and an open center that fits around and over the outer diameter or width of said frame. Although said adjustable contoured stopper 44 is preferably made of a very thin rigid metal wire form, any suitable material that produces similar results will do, such as plastic, wood, metal, etc. Adjustable contoured stopper 44 comprises a plurality of leg loops 38 that each fit snugly around the outer portion of vertical support leg 20 of said frame. Depending on the number of vertical support legs 20 on said frame, there will be an equal corresponding number of leg loops 38 on adjustable contoured stopper 44, being used. Because the adjustable contoured stopper 44 is thin, it enables it to fit almost undetected under wrap 23, comprising, paper, fabric, sheet metal, etc. Leg loop 38 is laterally connected to angled arm 42. Said angled arm 42 extends slightly outward from said leg loop 38 and meets another angled arm 42 in the center at hook point 40. Adjustable contoured stopper 44 would be placed under said wrap 23, when placed on said frame. While on said frame, angled arm 42 goes inwardly toward the center of said frame, meeting at hook point 40. The angled arm 42 is angled inwardly towards the center of said frame in order that lines are not visible behind wrap 23 when illuminated with light. Additionally, the angled arm 42 creates a hook point 40 that keeps removable light holder 36 steady and from sliding off said frame. Hook point 40 is the point where the light holder hook 35, of removable light holder 36, hooks on to said adjustable contoured stopper 44, as well as on contoured stopper 34, to be suspended inside of said frame. Removable light holder 36 has a plurality of light holder arms 37, each comprising a light holder hook 35. There may be three, four, five, or more of light holder arms 37, each with a corresponding light holder hook 35, depending on the number of hook points 40, on said adjustable stopper 44.

Adjustable contoured stopper can slide over and down said frame from the top via leg loops 38, each fitting around a vertical support leg 20. The leg loops 38 are made of a very thin but strong metal wire, so as not to be too obvious on the frame or interfere with the wrap 23, while accomplishing its task. However, any material that produces similar results will do, such as plastic, metal, wood, etc. The wire may also be thin enough to fit under wrap 23 while on said frame. Adjustable contoured stopper comprises a plurality of leg loops 38, three, four, five, or more, depending on the shape of the frame having three, four, five or more vertical support legs 20. Adjustable contoured stopper may comprise a plurality of two, three, four, five, or more, anchor 46 that plug into a corresponding anchor plate 48, located on the end of an angled arm 42. Anchor plate 48 may comprise of one, two, three, four, five or more anchor holes 47. The anchor holes 47 enables the adjustable contoured stopper to be tightened around vertical support legs 20 of said frame, when anchors 46 are plugged into corresponding anchor holes 47. To tighten adjustable contoured stopper, anchor 46 is placed in an anchor hole 47. If said Adjustable contoured stopper is not tight enough, it is placed in an anchor hole farthest away from it. To loosen said adjustable contoured stopper 44, anchor 46 is placed in anchor hole 47 that is closest to it. The tightening and loosening of adjustable contoured stopper works in conjunction with the slight slope of said frame. The slight slope of the frame, making the frame slightly narrower at the top and gradually widening on down, enables adjustable contoured stopper to be elevated on said frame at various elevation points along said vertical support legs 20, when anchors 46 are adjusted via the anchor holes 47. Adjustable contoured stopper 44 can slide up or down the frame and be adjusted to desired level via anchors and anchor holes. The plurality of anchor holes 47 enable many levels of tightening around said frame, to achieve many points of elevation along said vertical support legs 20.

DETAILED DESCRIPTION—FIGS. 5-6K—ALTERNATIVE EMBODIMENT

FIG. 5 is an isometric view of a short frame embodiment with a plurality of said vertical support legs 20, each comprising a foot 25 and an ankle 26. Each vertical support leg 20 has a slight slope from the top, and gradually widens on down. Said frame is preferably made of a metal wire, but any material that produces similar results will do such as metal, wood, or plastic. Said frame may have three, four, five or more vertical support legs 20. Said frame also may have a post 22 that can be used to mount said frame and doubles as a light or tea light holder.

FIGS. 5A-5E are extremely short frames that are low to the bottom of said frame. Said frames comprise of a plurality of vertical support legs 20 or 27, respectively. There may be three to six vertical support legs 20 or 27, respectively. Said support legs may or may not have a slant or slight slope, making the frame slightly narrower at the top and widening gradually and slightly on down. Said frames may comprise of a post 22 used to house a tea light, light, LED light, or a tea light. Said frames in FIGS. 5A-5E may or may have support legs 20 or 27, respectively. FIGS. 5A, 5B, and 5D each have support legs 20 that have a slight slope, making the width or outer diameter of said frame slightly narrower at the top, and widening gradually on down. FIGS. 5C and 5E each have support legs 27 that are specifically vertical with no slope or slant, making the outer diameter or width of the frame the same from the top on down to ankle 26. FIG. 5B demonstrates a frame embodiment that comprise a plurality of ankle 26 and foot 25. The ankle is formed by bending said support leg 20 at an angle that is less than 180°.

For FIG. 5A, because the support legs 20 each have a slight slope from the top on down, the ankle is not necessary to keep the wrap 23 from sliding down to the bottom of said frame; said slight slope will enable said wrap 23 to be elevated at various points along said vertical support legs 20. However, for frame embodiment in FIGS. 5C and 5E, the ankle 26 and foot 25 are necessary to keep the said wrap 23 from sliding down to the bottom of said frame, since the vertical support legs 27 are straight with no slope or slant. The purpose of the extremely short frame is to solve the problem of the frame embodiment toppling over in windy conditions. The taller the frame, the less stable it becomes, particularly in windy conditions, when said wrap 23 is wrapped and secured on said frame. Although a taller frame is less stable in general, it is more stable when it is used without said wrap 23 because the wind flows through said frame, since it is an open type frame, without disturbing its stability. However, when said wrap 23 is wrapped on said taller frame, the wind can no longer flow through the frame, so it ends up blowing said frame over from the force of the wind pushing against said wrap 23. Both a tall wrap 23 and a tall frame used together, make said frame embodiment and wrap 23 much less stable in windy conditions, because said frame is top heavy and said tall wrap makes it more susceptible to blowing over. When said frame is extremely short, and said wrap 23 secured on said frame is tall, it is much more stable in windy conditions, than a tall wrap and tall frame together. For a one size fits all frame embodiment, and for more stability, frame embodiment should be six inches in height and shorter, for use with both with short or tall said wrap 23, as seen in FIGS. 5-5G. Another one size fits all frame embodiment of four inches or shorter is even better for stability and can also be used to elevate said wrap 23 to a certain degree. Four inches or shorter as a one size fits all frame can provide a frame embodiment in which tall or short wrap 23 can be tightened and secured around vertical supports to create a lantern or paper, fabric, wire, or sheet metal craft; or be held up by ankle 26 and foot 25. A short frame embodiment that is one and three quarters to three inches and a quarter in height is most preferable for a one size fits all frame when said wrap 23, tall or short, does not need to be elevated or is elevated only a little. A frame that is one and three quarters to three inches and a quarter in height, provides the most stability in windy conditions and it still leaves the ability to elevate said wrap 23 on said frame, although to a lesser degree. Frame embodiments below one and three quarters of an inch can work as well, although one and three quarters of an inch to three and a quarter of an inch are most preferable. In cases where said wrap 23 is substantially tall in respect to height of said frame, said wrap 23 may be tightened on vertical supports 20 to keep it stable and erect on said frame, even when wrap 23 is not being elevated, particularly in windy conditions. For frame embodiments in FIGS. 5C and 5E where vertical support legs 27 are not sloped, a height of four inches and below is sufficient, since wrap 23 would not be elevated on said frame. However, one and three quarters of an inch to three inches and a quarter in height is most preferable, as it is less frame material to use and even more stable in windy conditions when wrap 23 is secured on said short frame, than on a taller frame. For frame embodiment that comprise of vertical support legs 27 that are straight with no slope or slant, said wrap may be tightened around vertical supports 27 to keep it stable and erect on said frame. FIG. 5F-5G illustrate one size fits all frame embodiments that each have short wrap 23, and tall wrap 23, respectively used on the same sized frame.

FIGS. 6-6G illustrate embodiments of fitted lights 49 and 51, respectively, comprising a light or LED light and that is designed to fit snugly within post 22 of said frame embodiments. FIGS. 6-6A demonstrate the top and bottom views of said fitted light 49 and casing that would fit all said frame embodiments. FIGS. 6D-6E illustrate the top and bottom views of said fitted light 51 and casing that would fit all said frame embodiments. FIGS. 6B-6C, and 6F-6G, respectively each demonstrate an alternative side view of said fitted lights 49 and 51, respectively. FIGS. 6B and 6F, respectively, demonstrate how light component has a top and bottom half that come together at or near the middle of said light component. FIGS. 6C and 6G, respectively, demonstrate how the light component may have a flat top or flat bottom half, that is attached to the bottom larger half, or top larger half, respectively, to enclose light components on the inside of casing. Said casing may be made of plastic or any material that produces similar results. Fitted lights 49 and 51, respectively, as seen in FIGS. 6-6G, each comprise a plurality of stem notch 50. Stem notch 50 is an orifice that fits around vertical stems in post 22. Although post 22 holds fitted lights 49 or 51 securely, said stem notches 50 keep said fitted lights even more secure and from shifting in said post, especially when the height of said post is short, stem notches prevent the fitted lights 49 and 51 from rising up and out of said post 22. Said fitted lights 49 and 51 may be any type of light that may be suitable for said frame embodiment, including LED or any type of solar light, or a light with an electric cord. FIGS. 6A and 6E, respectively, illustrate the bottom of said fitted lights 49 and 51 with a cord slot 54, where an electric cord would come out from the bottom of said fitted lights 49 and 51. Said fitted light 49 is generally square, diamond, or rectangular shaped. Said fitted light 51, as illustrated in FIGS. 6D and 6E have square corners cut off. Depending on how said fitted light 51 is positioned, it can appear square, diamond, or rectangular shaped. Since pointed corners are cut off, said fitted light 51 will be smaller in size than said fitted light 49. The smaller size will prevent the corners, that are seen in said fitted light 49, from poking or interfering with said wrap 23; particularly when said wrap 23 is a rectangular shape and all sides of the said wrap fit closer to said frame and fitted light. Additionally, said fitted light 51 may also be generally circular, or oval shaped and comprise of a plurality of stem notch 50, along perimeter of said fitted light. Depending on the number or vertical stems in post 22, two, three, four, five or more, there will be a corresponding number or stem notches 50, example, two, three, four, five, or more. However, there may also be less stem notches 50, than the total number of vertical stems in post 22; for example, where there are four vertical stems in post 22, there may only be two stem notches 50 because that is sufficient to hold said fitted light 49 and 51, respectively, in place.

Operation FIGS. 5-6K

FIGS. 5-5E demonstrate frames that enable users to create paper craft displays or lanterns by using a wrap 23 that can be secured on said frame, without being permanently attached to said frame. Various sized wrap 23 can be used. Said wrap 23 is secured on said frame by wrapping said wrap 23 and tightening around support legs 20 or 27. For frame embodiment with vertical support legs 27 that have no slope to elevate said wrap 23, said wrap can be held up on said frame by ankles 26, since there is no slope or slant to keep said wrap from sliding down to bottom of said frame. In FIGS. 5C and 5E, the ankle 26 acts as a stopper to allow wrap 23 to rest on, above feet 25. FIG. 5 is representative of a frame embodiment approximately four to six inches in height, while frame embodiments in FIGS. 5A-5E is representative of frame embodiments with a height of three inches or below. Said ankles 26, keep wrap 23 elevated at or near the ankles 26. For frame embodiments in FIGS. 5-5B, and FIG. 5D, said vertical support legs 20 each have a slight slope making said frame slightly narrower at the top and widens gradually down. Said slight slope enables wrap 23 to be elevated on said frame along the vertical support legs 20, by the difference in diameters of said vertical support leg 20 and wrap 23 that is wrapped and secured on said frame embodiment. Although said frame is short, there are ample elevation points to elevate said wrap 23 on said frame embodiment.

When said frame is extremely short and said wrap 23 is secured around said vertical support legs 20 or 27, the force of the wind against said wrap 23 is not enough to topple the frame over because the low frame is too heavy for the secured wrap 23 to lift just by the force of the wind, or fan, etc., unlike that of a taller frame, that becomes more unstable because of its height. Additionally, another advantage of an extremely short frame is that both tall and short wrap 23 can be used on the same said frame. Two short frames side by side, as seen in FIGS. 8A and 8B, one with substantially short wrap 23, and the other with substantially tall wrap 23. One would think one lantern was bigger than the other, although it is only said wrap 23 that is taller. Various looks can be achieved with one short frame. Additionally, in windy conditions, said short frame, or one size fits all frame is much more stable with wrap 23, than a taller frame above six inches. To achieve a more stable frame or lantern embodiment, and to use one size fits all frame with short or tall said wrap 23, said frame embodiments in FIGS. 5-5G should be six inches in height or shorter. A frame embodiment of four inches or shorter is even better for stability and, to also be capable of elevating said wrap 23 to a certain degree. Three inches is most preferable for stability in windy conditions, although it leaves a small degree to be able to elevate said wrap 23 on said frame. For frame embodiments in FIGS. 5C and 5E where vertical support legs 27 are not sloped, a height four inches and below is sufficient, since wrap 23 would not be elevated on said frame. Although, frame embodiments below two inches is sufficient, two to three inches in height is most preferable, as it is less material to use and gives ample vertical support legs 27 for wrap 23 to grip or tighten around for tall or short wrap 23. FIGS. 5D and 5E demonstrate a square shaped LED light secured in post 22; although, said LED light may also be circular in shape, or any shape that would fit inside will do, such as octagonal, hexagonal, rectangular, octagonal, etc.

To use said fitted lights 49 and 51, and 52, respectively, with any of said frame embodiments, the fitted lights 49, 51, or 52 are slid down into said post 22, either face up or face down, onto vertical stems of post 22 via the stem notches 50. Said fitted light is then pushed all the way down inside of said post 22 either upright or face down, depending on the desired direction of the light, up or down.

FIGS. 6H-6K illustrates said frame embodiments in use with fitted lights 49 and 51, respectively. Figures also demonstrate fitted lights 49 and 51 with electric cords. Any of said frame embodiments, tall or short, sloped legs or legs without a slope, may be used with said fitted lights 49 or 51. Although not illustrated, said fitted lights 49 and 51, can be placed face down to shine light downwards inside of said frame.

DETAILED DESCRIPTION—FIGS. 7-7Z, 11-14D—ALTERNATIVE EMBODIMENT

Figure 7Z:
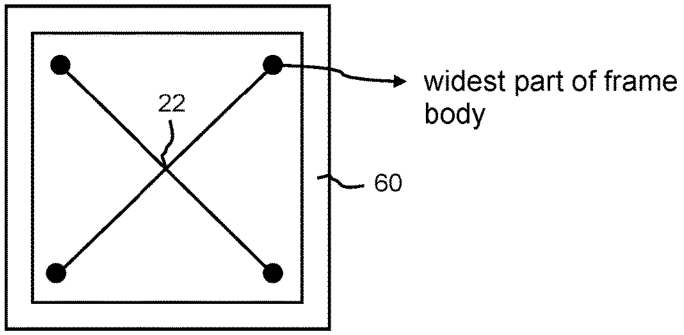

FIGS. 7-7Z illustrate various embodiments of frame stabilizers for said frame embodiment to prevent it from toppling over in windy conditions including indoor fans, etc. Said frame embodiments can be used with or without frame stabilizers. Although both short and tall frame embodiments can be used with frame stabilizers, the taller frame embodiments need it more than its shorter counterparts, since shorter frames are more stable than the taller ones, particularly in windy conditions and with wrap 23. The taller frames are great for elevating said wrap on said frame for various settings, so when conditions are windy, one may want to use a frame stabilizer to prevent frames from being blown over by the wind. Preferably, frame stabilizers in FIGS. 7-7Z, and 11 may be made of metal or sheet metal, metal wire; however, any material that produces similar results will do, such as wood or plastic. Additionally, any of the stabilizers in FIGS. 7-7O, and 11 that have walls 56 that are sloped, may also be square, circular, hexagonal octagonal, or rectangular shape; and any of these may also have no sloped or slanted walls at all.

FIGS. 7-7C illustrate a frame stabilizer 72. FIGS. 7-7A are top and isometric views of frame stabilizer 72, respectively. Said stabilizer 72 has a plurality of walls 56 that are each slightly sloped making the stabilizer slightly narrower at the top and gradually widens on down. The frame stabilizer 72 has a fully open top and bottom, is hollow inside, and comprise only of walls 56. The number of walls may be three to eight walls, but most preferably three to five walls, depending on the number of sides said frame embodiment has. Although walls 56 are solid as pictured in FIGS. 7-7N, walls 56 may also have walls that have cutouts, such as laser or die cut outs. Frame stabilizer may also be circular, or cone shaped which would be one continuous wall. As seen in the top view of FIG. 7B, said frame stabilizer 72 may have a cord slot 58 for an electric cord to be contained within, when using a light with a cord.

FIGS. 7D and 7E are top, and bottom views of frame stabilizers 72, respectively. FIG. 7D illustrates a frame stabilizer with four walls 56 that converge to form a stabilizer that is slightly narrower at the top and gradually widens down to the bottom. Extending parallel to a floor or a table, and inwardly from the top perimeter of each of the four walls 56 is a wall beam 60. Wall beam 60 extends inwardly towards the center of said stabilizer. There is an opening at the top of frame stabilizer 72, formed by wall beam 60. The bottom of said stabilizer 72 is fully open. In FIG. 7E, the inside of the wall 56 from the bottom view is labeled as 56. Although not pictured, frame stabilizer 72 may also have a cord slot 58, to accommodate an electric cord from the light.

FIGS. 7F and 7G are top and bottom views of frame stabilizers 72, respectively. FIG. 7F illustrates a frame stabilizer with four walls 56 that converge to form a stabilizer that is slightly narrower at the top and gradually widens down to the bottom. One of the walls 56 has a cord slot 58, to accommodate an electrical cord. The top of said stabilizer 72 is fully open. Extending parallel to a floor or a table, and inwardly towards the center from the bottom perimeter of each of the four walls 56 is a foot hold 64. Foot hold 64 extends inwardly towards the center of said stabilizer. There is an opening at the bottom of frame stabilizer 72, formed by foot hold 64. In FIG. 7G, foot hold 64 is pictured along with cord slot 62. Although not pictured, frame stabilizer 76 may come with or without a cord slot 58 or foot hold cord slot 62.

FIGS. 7H-7K are top and bottom views of frame stabilizers 72, that each comprise both a plurality of wall 56, wall beam 60, and foot hold 64. FIGS. 7H and 7I do not have a cord slot 58 or foot hold cord slot 62. FIGS. 7J and 7K illustrate said frame stabilizer 72 with both a cord slot 58 and foot hold cord slot 62. FIGS. 7H and 7J illustrates frame stabilizer 72 with four walls 56 that converge to form a stabilizer that is slightly narrower at the top and gradually widens down to the bottom. Extending inwardly from the top perimeter of each of the four walls 56, and parallel to a floor or a table that said stabilizer is sitting upright on, is a wall beam 60. Wall beam 60 extends inwardly towards the center of said stabilizer. There is an opening at the top of frame stabilizer 72, formed by wall beam 60. Extending inwardly towards center from the bottom perimeter of each of the four walls 56, and parallel to a floor or a table that said stabilizer is sitting upright on, is a foot hold 64. Foot hold 64 extends inwardly towards the center of said stabilizer. There is an opening at the bottom of frame stabilizer 72, formed by foot hold 64.

FIGS. 7L and 7M are isometric, and bottom views of frame stabilizers 72, respectively. FIG. 7L illustrates a frame stabilizer with four walls 56 that converge to form a stabilizer that is slightly narrower at the top and gradually widens down to the bottom. Extending parallel to a floor or a table that said stabilizer is sitting on, and inwardly from the top perimeter of each of the four walls 56 is a wall beam 60. Wall beam 60 extends inwardly towards the center of said stabilizer. There is an opening at the top of frame stabilizer 72, formed by wall beam 60. The bottom of said stabilizer 72 is open, and comprise of a plurality of foot hold 66, one for each corner of the stabilizer, as seen in FIG. 7M. Foot hold 66 may vary in shape, such as square, circular, triangular, rectangular, hexagonal, octagonal, etc. Preferably, foot hold 66 would be permanently attached to stabilizer, such as through welding, molding, carving, etc. FIGS. 7N and 7O are top and bottom views of frame stabilizers 72, respectively. Like FIG. 7M, they comprise of a plurality of foot hold 66; however, there is no wall beam 60 across the top. The top portion of frame stabilizer 72 in FIGS. 7N-7O is fully open.

FIGS. 7P-7S are isometric views of frame stabilizers without walls 56. They instead comprise of stability legs 68, and 69, respectively. FIGS. 7P and 7Q are isometric views of frame stabilizer 74, and each comprise of stabilizer legs 68. The frame stabilizer in FIG. 7Q also has a foot hold 66 attached to each leg, and the frame is FIG. 7P does not. They each comprise of a top beam 70. Top beam 70 is generally a flat thin piece of metal, sheet metal, wood, or plastic, although sheet metal is preferable. Stabilizer legs 68 are each laterally attached to the top beam 70 at the corners of said frame stabilizer 74. Said foot hold 66 is flush and flat with the surface that it sits on, such as a table or floor.

FIGS. 7R and 7S are isometric views of frame stabilizers 76. They each have a plurality of solid stabilizer legs 69. The number of legs may be three, four, five or more legs. They each also have a stability belt 80 that is solid and is laterally connected to said stabilizer legs 69. The stability belt 80 may vary in shape, being circular, triangular, square, rectangular, hexagonal, octagonal, oval, etc. Each of the stability belts 80 has an open center.

FIGS. 7T and 7U are isometric views of frame embodiment in use with frame stabilizers 72 and 76, respectively. FIG. 7T illustrates frame embodiment in use with frame stabilizer 72 that comprise of wall 56 and wall beam 60 to demonstrate how they would be in use together. FIG. 7U illustrates frame embodiment in use with wrap 23, and frame stabilizer 76 that comprise a circular stability belt 80, and four stabilizer legs 69.

FIG. 11 is an isometric view of an alternate frame stabilizer 72. FIG. 11 illustrates a frame stabilizer with four walls 56 that converge to form a stabilizer that is slightly narrower at the top and gradually widens down to the bottom. Extending at a downward pitched acute angle from the top perimeter of said wall 56, is a plurality of pitched wall beam 61. Each of wall beam 61 extends inwardly towards the center of said stabilizer. There is an opening at the top of frame stabilizer 72. The bottom of said stabilizer 72 is open, and may, or may not, comprise of a plurality of foot hold 66, one for each corner of the stabilizer, as seen in FIG. 7M. Foot hold 66 may vary in shape, such as square, circular, triangular, rectangular, hexagonal, octagonal, polygonal, etc. Preferably, foot hold 66 would be permanently attached to stabilizer, such as through welding, molding, carving, etc.

FIG. 12 is an isometric view of frame embodiment with wrap 23 clipped to the frame with metal clips. Each vertical side of said wrap is clamped onto a vertical support leg of said frame. Wrap 23 may or may not wrap around entire frame or, at least one open side of said frame is visible. Said wrap 23 may be secured onto to said frame by clips or any method that would produce similar results comprising plastic clips, clamp, binder clip, wire, eye holes and/or string, and/or y ties, etc. Clipping or securing said wrap 23 directly to said vertical support legs can work with either said frame with vertical support legs that have a slope, or with vertical support legs that are vertical with no slope. However, this is an effective method to use with said vertical support legs does not have a slope and one want to elevate said wrap 23 on said frame. Said wrap can be placed anywhere or at any elevation on said frame, just by clipping said wrap to a location on said vertical support legs.

FIGS. 13 and 13A are isometric views of stopper post 92, and said stopper post being placed onto said frame embodiment, respectively. The stopper post enables a light, tea light, or LED light or LED tea light to be placed at an elevation point on said frame, other than in said post 22. Said stopper post 92 has a built-in post and is formed with double stems 94, so that it can slide down onto the frame from the top, and can slide over and below post 22, to a lower position on said frame, and can contain an LED light or tea light. Said leg rests 93 enable said stopper post 92 to be elevated at a particular level on said frame by the leg rests 93, resting on vertical support legs 20 that each have a slight slope, making the frame slightly narrow at the top and widens on down. Said leg rests 93 each fit around said vertical support legs closely and snugly, as to not interfere or be obvious while in use with wrap 23. Said wrap 23 covers said stopper post 92 and said leg rests 93, while in use on said frame. The friction resistance created by the increasing diameter or width of said frame, and the fixed width of said stopper post 92, enables stopper post 92 to be elevated at a particular elevation point. Said stopper post 92 can also be adjustable, being elevated at various elevations on said frame embodiment, when said stopper post 92 is slightly wider than the widest part of said frame, on the portions of said frame where said wrap 23 would cover. The stopper post can then be secured at various elevations on said frame by clipping or securing, double stems 94 together on the area right inside said frame embodiment, at or near the vertical support legs 20. This tightens the area around the vertical support legs and restricts movement of said stopper post 92, around that leg. The clipping of double stems 94 can be at least one leg, although two or more legs are preferred, depending on the number of vertical support legs of said frame.

FIG. 14A contains the side view of an ordinary mount containing a mount and stake head 95. FIG. 14B is the top view of a mounting device comprising mount and stake head 95. FIG. 14C demonstrates how post 22 of frame embodiment would be placed inside of said mount and stake head 95. FIG. 14D are two-dimensional views of a stake, and a frame embodiment used with a stake, respectively, demonstrating how stake or mounting device are used with said frame. Mount and stake head 95 is designed to hold and contain post 22 to stake or mount the frame and keep it rigid and from shifting. Mount and stake head 95 has an open center surrounded by a plurality of horizontal and vertical stems that are welded together to form a square or rectangular shaped open enclosure. Mount and stake head 95 has an inner diameter that is slightly larger than the outer diameter of post 22. This enables a snug and secure fit around post 22. Mount and stake head 95 is an extension on a mounting device, or a stake. They are made of the same material as typical mounting devices and stakes, which is typically metal, however, any material that produces similar results will do, such as comprising of wood, plastic, metal wire, etc.

Operation FIGS. 7-7Z, 11-14D

The purpose of any of the frame stabilizers 72, 74, and 76 are to keep said frame embodiments seen in FIGS. 1-1B, 2A-2B, 3D-3G, and 4D-5, from toppling over in windy, breezy, or unstable conditions. All the frame stabilizers 72, 74, and 76 fit over said frame embodiment. The frame stabilizers 72, 74, and 76, having open and hollow centers, tops, and bottoms, slides down over said frame from the top; and, fit loosely around said frame embodiment. While in use, the loose fit enables the stabilizers to act as independent forces on said frame embodiment when the frame becomes unstable. For frame stabilizers FIGS. 7-7O, the walls 56 act as forces to keep said frame from toppling over, the slight sloped or slanted walls 56, making stabilizer slightly narrower at the top than the bottom, is an added strength and opposing force to keep said frame from toppling over. If there is too much space between said frame and said stabilizers or walls/wall beams, the frame would then act as a force on said stabilizers, and would lift the stabilizer as it fell, taking down the stabilizer with it. As seen in FIG. 9, if the frame begins to topple, the wall 56 acts as a separate force that pushes back on Side A, that the frame is falling towards. Side B, the opposite wall 56, pushes down on the feet or vertical leg supports 20, or 27, that are tilted up. While in use, the distance as seen in FIGS. 7W-7Z, enables stabilizer to act as separate forces on said frame. If any of said frame stabilizers were snug or too close to frame embodiment, while in use, it would not act as a force on said frame, but would rather act as part of the frame and would topple over with the frame. If there is too much space between said frame and said stabilizers or walls/wall beams, the frame would then act as a force on said stabilizers, and would lift the stabilizer as it fell, taking down the stabilizer with it. The foot hold 64 or foot tab 66 merely hold the base or feet 25 of said frame embodiment to enable said frame to be lifted simultaneously with said frame stabilizer; when it needs to be moved or carried. Said foot tabs 66 and foot hold 64 are parallel to a horizontal axis.

In FIGS. 7D, 7H, 7J, and 7L wall beam 60 is an additional force that acts on said frame embodiment to keep it from toppling over in windy conditions. The edge of wall beam 60 is virtually perpendicular to said vertical support legs 20 or 27. The wall beam 60 catches, so to speak, the frame on Side A, the side that it is falling towards. Additionally, because the wall beam 60 is virtually perpendicular to the wall 56, it is a stronger force than just the wall 56 by itself. Furthermore, on the opposite side, Side B where said frame is tilted up, both the lower half of wall 56 and the wall beam 60 may act as forces, pushing down on said frame to keep it from tipping over. The wall 56 on Side B would push down on each of the frame's foot 25, or on the vertical support legs 20 or 27, depending on the embodiment. The wall beam 60 on Side B would hold down, or push down on vertical support legs to keep said frame from tipping over. While in use, the distance between said frame and frame stabilizer, as seen in FIGS. 7W-7Z, enables stabilizer to act as separate forces on said frame.

FIGS. 7P-7Q illustrate frame stabilizers 74 that are a bit more open. The top beam 70 acts like wall beam 60, as previously described, in that it holds said frame on side that it is falling towards, and holds down the opposite side to keep it from tipping over. Stabilizers in FIGS. 7P-7Q also have space between said top beam 70 and said frame. Said stabilizers slide down and over top of said frame, and fit loosely around said frame to give it some tipping room, enabling stabilizers to act as an independent force against frame when tipping. If said stabilizer is too close or fits frame snugly, it would act as part of said frame and would tip with frame. If there is too much space between said frame and said stabilizers or walls/wall beams, the frame would then act as a force on said stabilizer, and would lift the stabilizer as it fell, taking down said stabilizer with it. While in use, the distance between said frame and stabilizer, as seen in FIGS. 7W-7Z, enables stabilizer to act as an independent force on said frame. Stabilizer legs 68 cover the outside portion of vertical support legs 20 and 27 of frame embodiments.

FIGS. 7R-7S illustrate an alternative embodiment of frame stabilizers 76 that are open and have a plurality of stabilizer legs 69 that each, when in use with said frame, are positioned between the vertical support legs 20 or 27. Frame stabilizers 76, having open centers, slides down over said frame from the top; and, fits loosely around said frame embodiment. While in use, the loose fit enables the stabilizers to act as independent forces on said frame embodiment if the frame becomes unstable. If there is too much space between said frame and said stability belts 80, the frame would then act as a force on said stabilizers, and would lift the stabilizer as it fell, taking down the stabilizer with it. Too much space could cause said vertical support legs 20 or 27, or any of foot 25 to act as a lever on said stability belt 80, lifting said frame stabilizer with it, as it falls. FIG. 9 demonstrates how stabilizer 76 will act on Side A, the side frame is tipping towards, where stability belt 80 holds said frame up. On side B, the stability belt 80 will push down on said vertical support legs 20 or 27, where it comes in contact with said vertical support legs 20 or 27.

FIGS. 7T, 7U, and 7V are isometric views of frame embodiment in use with frame stabilizers 72, 76, and 74, respectively. FIG. 7T illustrates frame embodiment in use with frame stabilizer 72 that comprise of wall 56 and wall beam 60 to demonstrate how they would be in use together. FIG. 7U illustrates frame embodiment in use with wrap 23, and frame stabilizer 76 that comprise a circular stability belt 80, and four stabilizer legs 69. FIG. 7V illustrates frame embodiment in use with frame stabilizer 74 comprising four stabilizer legs. Said stabilizer 74 in this embodiment, comprise of a plurality of foot hold 66 that are used to lift and support frame embodiment, when said stabilizer is being lifted or transported to another location.

While in use, the distance between said frame and frame stabilizers, as seen in FIGS. 7W-7Z, enables the stabilizers to act as independent forces on said frame embodiments. Depending on the wind conditions and the direction it is blowing, frame stabilizer in FIG. 7R that comprise a circular stability belt 80, may be turned to the best position that resists the wind. Depending on the force of the wind and/or the direction that said frame is falling or tilting towards, the frame stabilizer may be slightly heavier closest to area near the stabilizer leg 69. In this case, the stabilizer in FIG. 7R may be positioned with stabilizer legs close to vertical support legs 20 or 27 which is opposite of FIG. 7U, where said stabilizer legs 69 are centered between vertical support legs, making it a bit more difficult for stabilizer legs to lift on side of stabilizer leg.

In FIG. 11, said frame stabilizer 72 comprises a plurality of pitched wall beam 61. Said pitched wall beam 61 is an additional force that acts on said frame embodiment to keep it from toppling over in windy or breezy conditions. Said frame comprises a plurality of pitched wall beam 61. Said pitched wall beam 61 is pitched in an inwardly and downward position towards center of said stabilizer, from the top perimeter of said wall 56, at an acute angle. The pitch in said pitched wall beam 61 acts as a reinforced strength that pushes down on said frame on the side that is lifted up, similar to Side B, as seen in FIG. 9. The said downward pitch is sharp and provides a sufficient force to push down on said tipping frame to keep it from toppling over. The pitched wall beam 61 on the side of said frame, where the frame is tipping towards, pushes back on said frame embodiment. Additionally, because the pitched wall beam 61 has a pitched angle, inwardly in a downward position, it is a stronger force than just the wall 56 by itself. While in use, the distance between said frame and pitched wall beam 61, as seen in FIGS. 7W-7Z, enables stabilizer to act as separate forces on said frame.

DETAILED DESCRIPTION—FIGS. 8-10, 12-14D ALTERNATIVE EMBODIMENT

FIG. 8 is an isometric view of frame embodiment that has four vertical support legs 27, that are straight and vertical with no slope or slant. Foot 25 has a bend that is less than 180° that forms ankle 26. Said frame embodiment is a shortened frame that provides more stability in windy or breezy conditions. Although two inches and below is most preferable for stability and lower material cost for said frame, four inches and below is suitable to get good results for added stability of said frame in light windy or breezy conditions. Additionally, said frame may be used with substantially short wrap 23, as well as substantially tall wrap 23, with the same said frame embodiment in FIG. 8.

FIGS. 8A and 8B illustrate the short frame embodiment that has vertical support legs 27, that are not sloped or slanted, and is in use with a short and a tall wrap 23, respectively. Ankle 26 and foot 25 keep said wrap 23 elevated at, or slightly below said ankle when tightened and secured on said frame embodiment. The shortened frame in this embodiment is four inches or shorter. Although a height of two inches and shorter is most preferable for said frame embodiment in FIGS. 8A and 8B to be most stable in light windy conditions, and accommodating both substantially short wrap 23 and substantially tall wrap 23, with respect to each other; four inches and shorter is suitable to accommodate both said short and tall wrap 23. FIGS. 8A and 8B are side by side to demonstrate the contrast between short wrap 23, and tall wrap 23, respectively on same said shortened frame embodiment FIG. 9 is an isometric view of frame embodiment in use with frame stabilizer 72. FIG. 9 illustrates a frame embodiment that has become unstable due to windy or breezy conditions. As illustrated, frame embodiment is tipping towards side A, while inside of said frame stabilizer 72.

FIG. 10 demonstrates a fitted light 52 that comprises three stem notches to accommodate a frame embodiment that comprise of three or more vertical support legs, and a post that comprise of three vertical stems. This frame requires a fitted light that has a flush edge 91 in order not to interfere with wrap 23 that is flush on said frame.

FIG. 12 is an isometric view of a frame embodiment with said wrap 23 clipped to the frame with metal clips. Said frame may comprise of a plurality of vertical support legs 20 or a plurality of vertical support legs 27, and can comprise of three, four, five, or more vertical support legs. Each vertical side of said wrap is clamped or clipped onto a vertical support leg of said frame. The skeletal frame of said frame embodiment makes the use of clips in this manner easy and desirable. Said wrap 23, being stiff but flexible, is erect on said frame and can bow out, having a convex shape while secured on said frame, with open space, and not touching at least the front part of said frame, except for where it is clipped or secured on said frame. Additionally, said wrap 23 can be secured, clipped or clamped to any part of the vertical support legs 20 or 27 to support it on said frame. In doing so, some portion of said frame, for example the back, may be exposed, which can be a desirable effect. Although any device produces similar results is suitable, metal clips are preferable due to its durability and strength.

FIGS. 13 and 13A are isometric views of stopper post 92, and said stopper post being placed onto said frame embodiment, respectively. Stopper post 92 is an alternative embodiment for stoppers 30, 34, and 44 and removable light holders 31 and 36. The stopper post enables a light, tea light, or LED light or LED tea light to be elevated at another elevation point on said frame, other than in said post 22. Said stopper post 92 is made of any material that is extremely thin, and rigid as not to be obtrusive to wrap 23 when wrapped on said frame. Although metal wire is most preferable, any material that produces similar results will do such as wood, metal, or plastic. Said stopper post 92 has a built-in post and is formed with double sides, so that it can slide down onto frame from the top, and can slide over and below post 22, to a lower position on said frame, and can contain an LED light or tea light. Said stopper is also contoured to the shape of said frame embodiment to diminish any visibility of said lines or shadows cast by said stopper post 92 and said lighting. The stopper generally may comprise of a skeletal frame. The stopper post 92 is made of a smooth surface. Stopper post 92 comprises a plurality of leg rests 93, comprising of three, four, or five leg rests 93. Said leg rests 93 enable said stopper post 92 to be elevated at a particular level on said frame by the leg rests 93 resting on vertical support legs 20 that each have a slight slope, making the frame slightly narrow at the top and widens on down. Said leg rests 93 each fit around said vertical support legs closely and snugly, as to not interfere or be obvious while in use with wrap 23. Said wrap 23 covers said leg rests 93, while in use on said frame. The friction resistance created by the increasing diameter or width of said frame, and the fixed width of said stopper post 92, enables stopper post 92 to be elevated at a particular elevation point. Said stopper post 92 may come in various widths or diameters to provide various elevation points on said frame and to elevate said stopper post 92. Said stopper post 92 comprise of a plurality of horizontal and vertical stems, double stems 94 that are each doubled, and is parallel to its counterpart. A closed round edge, leg rest 93, starts the top horizontal double stem 94, with a small distance separating the individual stems. The double stem 94 extends horizontally, away from said leg rest 93; and, then bends downward at a 90° angle into a vertical double stem that extends lengthwise on down, followed by another 90° bend at the bottom, where said double stems 94 bend upward to into a 90° angle that is parallel to a horizontal axis. Double stems 94 next extend inwardly toward the center of said stopper post 92, where each horizontal stem then extends in opposite directions, at a 90° angle where each stem meets up with another stem to form another double stem that is a replica of the first said stem. The double stems 94 are placed at equally spaced intervals, to form a stopper post comprising of three, four, five or more double stems. Said double post is formed to have an opening that slides over said frame embodiment and fits it like a female plug. Said stopper post slides all the way down until it is stopped by friction from the difference in diameters or widths of said frame and said stopper post 92.

FIG. 14A contains the side view of an ordinary mount containing a mount and stake head 95. FIG. 14B is the top view of a mounting device comprising mount and stake head 95. FIG. 14C demonstrates how post 22 of frame embodiment would be placed inside of said mount and stake head 95. FIG. 14D are two-dimensional views of a stake, and a frame embodiment used with a stake, respectively, demonstrating how stake or mounting device are used with said frame. Mount and stake head 95 is designed to hold and contain post 22 to stake or mount the frame and keep it rigid and from shifting. Mount and stake head 95 has an open center surrounded by a plurality of horizontal and vertical stems that are welded together to form a square or rectangular shaped open enclosure. Mount and stake head 95 has an inner diameter that is slightly larger than the outer diameter of post 22. This enables a snug and secure fit around post 22. Mount and stake head 95 is an extension on a mounting device, or a stake. They are made of the same material as typical mounting devices and stakes, which is typically metal, however, any material that produces similar results will do, such as comprising of wood, plastic, metal wire, etc.

Operation FIGS. 8-10, 12-14D

FIG. 8 is an isometric view of frame embodiment that has four vertical support legs 27, that are not sloped or slanted. Foot 25 has a bend that is less than 180° that forms ankle 26. Ankle 26 enables the wrap 23 to be elevated at, or slightly below said ankle 26 when said wrap 23 is tightened and secured on said frame embodiment.

FIGS. 8A and 8B illustrate the short frame embodiment that has vertical support legs 27, that are not sloped or slanted, and is in use with short and tall wrap 23, respectively. Ankle 26 and foot 25 keep said wrap 23 elevated at, or slightly below said ankle when tightened and secured on said frame embodiment. The shortened frame in this embodiment is four inches or shorter and said shortened height produces a more stable frame in windy, breezy, or unstable conditions. Although both short and tall frames can be mounted, the short frames are do not expose as much of the support legs 20 or 27, as the taller version; which is more aesthetically pleasing when mounting. Although heights of one and three quarter inches and below will suffice, heights over one and three quarter, up to three and a quarter inch is more stable in windy conditions for said frame embodiment in FIGS. 8A and 8B, and for accommodating both short and tall, wrap 23. This gives ample gripping room of said wrap on said support legs. Four inches and shorter are suitable to accommodate both short and tall wrap 23 while withstanding light winds or breeze, or unstable conditions like a slight bump of a table that said frame is sitting on. Said frame embodiment may also be used with any of the fitted lights 49, 51, or 52 and/or with frame stabilizers 72, 74, or 76.

FIGS. 8A and 8B are side by side to demonstrate the contrast between short wrap 23, and tall wrap 23, respectively on same said shortened frame embodiment, with sloped legs or no sloped legs. One may assume that a short frame does not work well with tall wrap, but, it is the most stable in windy conditions, and works quite well, particularly when said wrap 23 is tightened securely around said vertical support legs. Said short frame may be narrow or wide. Short and wide frames may also support tall and wide wrap.

FIG. 9 is an isometric view of frame embodiment in use with frame stabilizer 72. FIG. 9 illustrates a frame embodiment that has become unstable due to windy or breezy conditions. As illustrated, frame embodiment is tipping towards side A, while inside of said frame stabilizer 72. The normal force of side A of frame stabilizer interrupts the possible fall of said frame embodiment, when tipping occurs, and keeps it from toppling over. Said frame stabilizer pushes back on said frame by wall 56 on side A. Side B of frame stabilizer provides an additional force on the opposite side, pushing down on vertical supports 20 or 27, or on feet 25, depending on said frame embodiment, to keep said frame embodiment from toppling over. Although the sloped walls 56, making said frame stabilizer slightly narrower at the top and widens gradually on down, are preferable and provide more stability, straight walls with no slope or slant will work as well.

FIG. 10 demonstrates a fitted light 52 that comprises three stem notches to accommodate a frame embodiment that comprise of three vertical support legs, and a post 22 that comprise of three vertical stems. This frame can be used with a fitted light that has said flush edge 91 in order not to interfere with wrap 23 that is flush on said frame. The fitted light 52, in FIG. 10, slides onto the inside of post 22 along vertical stem via stem notches 50. Fitted light 52 works in the same manner as fitted lights 49 and 51, except that it can best accommodate a frame embodiment that comprise of just three vertical stems in post 22.

FIG. 12 is an isometric view of frame embodiment with wrap 23 clipped to the frame with metal clips. Each vertical side of said wrap is clamped onto a vertical support leg of said frame. Wrap 23 may or may not wrap around entire frame or, at least one open side of said frame is visible. Said wrap 23 may be secured onto to said frame by clips or any method that would produce similar results comprising plastic clips, clamp, binder clip, wire, eye holes and/or string, and/or y ties, etc. Clipping or securing said wrap 23 directly to said vertical support legs can work with either said frame with vertical support legs that have a slope, or with vertical support legs that are vertical with no slope. However, this is an effective method to use with said vertical support legs does not have a slope and one want to elevate said wrap 23 on said frame. Said wrap can be placed anywhere or at any elevation on said frame, just by clipping said wrap to a location on said vertical support legs. Additionally, this method also enables one to create asymmetrical shapes on said frame, just by clipping one side of said wrap high on one vertical support leg, and the other side of said wrap low on another said vertical support legs 20 or 27, for example. Since the wrap has a stiff but flexible nature, it can also, by clipping its ends to said frame, sit erect and away from said frame, creating an alternative configuration.

FIGS. 13 and 13 A are isometric views of stopper post 92, and said stopper post being placed onto said frame embodiment, respectively. The stopper post enables a light, tea light, or LED light or LED tea light to be placed at an elevation point on said frame, other than in said post 22. Said stopper post 92 has a built-in post and is formed with double sides, so that it can slide down onto the frame from the top, and can slide over and below post 22, to a lower position on said frame, and can contain an LED light or tea light. Said leg rests 93 enable said stopper post 92 to be elevated at a particular level on said frame by the leg rests 93, resting on vertical support legs 20 that each have a slight slope, making the frame slightly narrow at the top and widens on down. Said leg rests 93 each fit around said vertical support legs closely and snugly, as to not interfere or be obvious while in use with wrap 23. Said wrap 23 covers said stopper post 92 and said leg rests 93, while in use on said frame. The friction resistance created by the increasing diameter or width of said frame, and the fixed width of said stopper post 92, enables stopper post 92 to be elevated at a particular elevation point. Said stopper post 92 can also be adjustable, being elevated at various elevations on said frame embodiment, when said stopper post 92 is slightly wider than the widest part of said frame, on the portions of said frame where said wrap 23 would cover. The stopper post can then be secured at various elevations on said frame by clipping or securing, double stems 94 together on the area right inside said frame embodiment, at or near the vertical support legs 20. This tightens the area around the vertical support legs and restricts movement of said stopper post 92, around that leg. The clipping of double stems 94 can be at least one leg, although two or more legs are preferred, depending on the number of vertical support legs of said frame.

FIG. 14A contains the side view of an ordinary mount containing a mount and stake head 95. FIG. 14B is the top view of a mounting device comprising mount and stake head 95. FIG. 14C demonstrates how post 22 of frame embodiment would be placed inside of said mount and stake head 95. FIG. 14D are two-dimensional views of a stake, and a frame embodiment used with a stake, respectively, demonstrating how stake or mounting device are used with said frame. Mount and stake head 95 is designed to hold and contain post 22 to stake or mount the frame and keep it rigid and from shifting. Mount and stake head 95 has an open center surrounded by a plurality of horizontal and vertical stems that are welded together to form a square or rectangular shaped open enclosure. Mount and stake head 95 has an inner diameter that is slightly larger than the outer diameter of post 22. This enables a snug and secure fit around post 22. Mount and stake head 95 is an extension on a mounting device, or a stake. They are made of the same material as typical mounting devices and stakes, which is typically metal, however, any material that produces similar results will do, such as comprising of wood, plastic, metal wire, etc.

Any of the aforementioned frame embodiments can be used with any of the frame stabilizers, wrap 23, fitted lights 49, 51, or 52, removable tea light holder, removable light holders, stopper, contoured stoppers, adjustable contoured stoppers, and/or stopper posts. Additionally, said wrap may be tightened on said frame embodiments to elevate said wrap 23, or to secure said wrap on said frame to keep it from blowing away or to keep it erect on said frame.

Advantages

From the description outlined, several advantages of various embodiments of my frame and frame assembly for lanterns and paper lanterns become clear:

(a) A reusable frame assembly that enables the user to change out the paper repeatedly for an infinite variety of styles and uses, and does not require paper or similar material to be permanently adhered to the frame.

(b) A one size fits all frame that can be used with substantially both tall and substantially short wraps on the same sized frame.

(c) A frame assembly that enables paper to be positioned at various elevations on the frame.

(d) A frame assembly that would enable one to create various crafts beyond a paper lantern while incorporating other trinkets within the body of the frame.

(e) A frame and frame assembly that is configured to be mounted on a wall or staked in the ground.

(f) A frame support that gives handmade paper or shade lanterns a more sophisticated look where the paper conforms to the edges of the frame creating a uniform and polished appearance.

(g) The frame and frame assembly are cost effective in that they can be used repeatedly for an infinite number of events, just by changing said wrap material.

(h) The wrap material is super easy to assemble and can be set up in just a few short minutes.

(i) Several frame embodiments that are stable in windy or breezy conditions.

(j) Several frame embodiments that enable one to adjust the level of the light on said frame.

(k) A one size fits all frame that is both stable and can be used for both substantially tall wrap and substantially short wrap material.

(l) The frame or apparatus may come with or without a post 22, and can be used with or without light. Stoppers, removable light holders, and stopper posts are accessories that can easily convert the said apparatus into a light or lantern, in addition to elevating the light on the frame when the wrap covering is elevated.

CONCLUSION, RAMIFICATIONS, AND SCOPE

Accordingly, the reader will see that the frame and frame assembly of various embodiments can be used to create paper lanterns quickly, and inexpensively. Additionally, the frame and frame assemblies gives handmade paper lanterns and crafts a more polished appearance that can be used in professional affairs such as weddings and corporate events. The frame and frame assemblies enables wrap 23 comprising of materials that paper, sheet metal, plastic, wire, and fabric that has a stiff quality to be elevated at countless points along the frame to create a variety and looks and styles.

The foregoing description of the embodiments of the invention has been presented for purposes of illustration and description. It is not intended to be exhaustive or to limit the invention to the precise form disclosed, and many modifications and variations are possible considering the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

I claim:

1. An apparatus for making and displaying decorative ornamentation and lanterns comprising:

a. a plurality of vertical support legs b. wherein said vertical support legs are connected to form said apparatus or a frame c. wherein said apparatus having a gradually increasing first diameter or width that gradually extends outward from the top of the apparatus, wherein said apparatus is slightly narrower at the top;

d. wherein said apparatus comprises a plurality of elevation points or locations along said vertical support legs f. a stiff wrap surrounding the apparatus comprising paper or wire, g. wherein said stiff wrap is supported at various elevations on the apparatus by said increasing first diameter or width of said apparatus, limiting vertical movement or slippage of said stiff wrap beyond said preferred elevation points or location h. wherein said stiff wrap, when secured on said apparatus, comprises a second inner diameter or inner width that is smaller than the largest said diameter or said width of said apparatus i. wherein said apparatus is self-standing and self-supported.

2. The apparatus in claim 1 wherein said apparatus is a lantern, and may be made of any of metal wire, metal, wood, glass, or plastic.

3. The apparatus in claim 1 further comprising a. a post b. wherein said post comprises a plurality of L shaped stems that are connected at the horizontal portion of said L shaped stems, at equally spaced intervals c. wherein said post may comprise of two, three, four, five, or more of the L shaped stems.

4. An apparatus for making and displaying decorative ornamentation and lanterns comprising:

a. a plurality of vertical support legs b. wherein said vertical support legs are connected to form said apparatus c. wherein said apparatus having an increasing first diameter or width so that said apparatus gradually extends outward from the top of the apparatus, wherein said apparatus is slightly narrower at the top d. wherein said apparatus comprises a plurality of elevation points or locations along said vertical support legs e. a stopper comprising a circular or a plurality of horizontal arms that are laterally connected to form an enclosure that comprises an open center and fits horizontally around said apparatus f. wherein said enclosure or inner diameter of said stopper may comprise of a generally circular, triangular, square, rectangular, hexagonal, heptagonal, octagonal, or polygonal shape g. wherein said stopper having a second inner diameter or width that is smaller than the increasing first diameter or width so that said stopper is supported at various elevation points or locations on the apparatus by said increasing first diameter or width of said apparatus due to the difference in the first and second diameters or widths limiting vertical movement or slippage of the stopper beyond said preferred elevation points or locations; and h. wherein said apparatus is self-standing and self-supported.

5. The apparatus in claim 4 further comprising a frame stabilizer a. wherein said frame stabilizer has a plurality of legs or walls, comprising three, four, five or more legs or walls, respectively b. wherein said frame stabilizer is self-standing and is supported by said legs or said walls c. wherein said frame stabilizer comprises a hollow center formed by the plurality of walls adjoined to form an enclosed but hollow said frame stabilizer, further comprising an open top and open bottom, or d. an open center formed by a stability belt comprising any of a circular, square, rectangular, triangular, pentagonal, hexagonal, heptagonal, or octagonal, polygonal shape e. wherein said stability belt is circular, square, rectangular, triangular, pentagonal, hexagonal, heptagonal, octagonal, or polygonal in shape and is adjoined to, at a right or obtuse angle, and held up by said stabilizer legs f. wherein said frame stabilizer comprises an open or hollow center, whereby said apparatus fits inside of said open or hollow center of said frame stabilizer g. wherein the frame stabilizer slides over said apparatus from the top, whereby said stability belt, or said walls, or said legs, surround the apparatus h. wherein said open or hollow center of frame stabilizer comprises a moderately loose fit around said apparatus, whereby said loose fit gives said apparatus sufficient room to tip, whereby said stabilizer acts as a separate and independent force that holds up the side of the apparatus that said apparatus is tipping towards, and pushes down on the side of the apparatus that is being lifted when tipping.

6. The apparatus in claim 5, wherein said stabilizer comprises a wall beam, a. wherein said wall beam is parallel to a horizontal axis b. wherein said wall beam is adjoined, at a right or obtuse angle, to the top perimeter of said stabilizer, and extends horizontally and inwardly towards the center of said stabilizer, leaving an opening in the center, comprising a moderately loose fit around said apparatus, and c. wherein said wall beam pushes horizontally on said apparatus on the side that said apparatus is tipping towards, whereby said wall beam acts as a reinforcing strength on said tipping apparatus on side being lifted, and pushes down on the side of the apparatus that is being lifted when said apparatus is tipping.

7. The apparatus in claim 4 wherein said stopper comprises a removable tea light holder, a. wherein said removable tea light holder comprises a plurality of horizontal and vertical stems where each top said horizontal stem, on one end is perpendicularly connected to said vertical stem, and said vertical stem is then connected to bottom said horizontal stem on the opposite end as top said horizontal stem forming an irregular shaped z, except that the horizontal and vertical stems are formed at 90° b. wherein said plurality of horizontal stems are connected at the bottom opposite the end that is connected to the vertical stem, forming at the center at equally spaced intervals c. wherein said horizontal stem is connected to two, three, four, or five other said horizontal stems at equally spaced intervals d. wherein said apparatus is a lantern.

8. The apparatus in claim 4 wherein said apparatus is a lantern.

9. The apparatus in claim 4 wherein said apparatus comprises a. a post b. wherein said post comprises a plurality of L shaped stems that are connected at the horizontal portion of said L shaped stem, at equally spaced intervals c. wherein said post may comprise of two, three, four, five, or more said L shaped stems.

10. The apparatus in claim 4 wherein said stopper is adjustable, and a. wherein said stopper further comprises an inner diameter or width that is adjustable, whereby said stopper can be secured at various elevations on said apparatus b. wherein said stopper comprises a plurality of angled arms that, at least on one end, comprises an anchor at a right or acute angle c. one or two anchors, and a corresponding number of anchor plates d. wherein said anchor plate is adjacently adjoined to one or two ends of said angled arm e. wherein said anchor plates each have one, two, three or more anchor holes serially aligned f. wherein said anchors each fit inside of any of said anchor holes whereby said stopper can be adjusted and secured on said apparatus.

11. The apparatus in claim 4 wherein said stopper comprises a plurality of leg notches a. wherein said leg notches are each form fitting around a corresponding vertical support leg, and a. each side of said leg notch extends out and is connected to an angled arm b. wherein said angled arms that are adjacently connected to said leg notch, each extend out horizontally and away from each other on an angle that goes toward center of said stopper, c. wherein said angled arms, going away from each other are, consequently, moving towards an angled arm from the other side that, going inwardly and horizontally towards the center of said apparatus, forms a v-shaped hook point, whereby a removable light holder can be held securely d. wherein said stopper is loosely contoured to said apparatus, wherein said angled arms and hook points are closer to the center of said apparatus whereby shadows and lines of stopper behind wrap, are less obvious when light is used e. wherein said contoured stopper comprises three or more leg notches and a pair of angled arms per leg notch f. wherein said contoured stopper is skeletal, and is made of very thin but rigid material comprising metal wire, metal, plastic, or wood g. wherein said contoured stopper loosely resembles an outline of a four point star that h. wherein said contoured stopper fits over and on said apparatus and can be elevated at a particular point on said apparatus due to the difference in diameters of said gradual increasing diameter or width of said apparatus, from the top, and the diameter or width of said contoured stopper.

12. An apparatus for making and displaying decorative ornamentation and lanterns comprising:

a. a plurality of vertical support legs b. a plurality of horizontal stems c. wherein said vertical support legs are connected to vertical stems to form a apparatus d. wherein said apparatus is short e. wherein said apparatus is self-standing and self-supported f. wherein said increasing first diameter or width so that said apparatus gradually extends outward from the top of the apparatus, wherein said apparatus is slightly narrower at the top;

g. wherein said apparatus comprises a plurality of elevation points or locations along said vertical supports;

h. a stiff pliable wrap i. wherein said stiff pliable wrap having a second diameter or width, so that said stiff pliable wrap is supported at various elevation points or locations on the apparatus by said increasing first diameter or width of said apparatus due to the difference in the first and second diameters or widths limiting vertical movement or slippage of the stiff pliable wrap beyond said preferred elevation points or locations;

j. wherein said stiff pliable wrap comprises any of paper, metal, sheet metal, fabric, plastic, wire, metal or any combination of the aforementioned k. wherein said stiff pliable wrap is supported by friction resistance produced by at least one vertical support leg being substantially vertical, having a slight slope.

13. The apparatus in claim 12 wherein said apparatus comprises of three, four, five or more vertical support legs, and a. wherein said apparatus comprises a height of five inches or below, whereby said apparatus is more stable in windy conditions and can be used with both substantially tall wrap or substantially short wrap material.

14. The apparatus in claim 12 wherein said apparatus is made of a material that may comprise of metal wire, metal, wood, or plastic or any combination of the aforementioned.

15. The apparatus in claim 12 wherein said apparatus comprises a height of one and three quarter inches to three and a quarter inch whereby apparatus is very stable in windy conditions, and b. said apparatus is one size fits all with the ability to use substantially tall wrap or substantially short wrap on the same apparatus and maintain stability in windy conditions.

16. The apparatus in claim 12 wherein said apparatus is a lantern.

17. The apparatus in claim 15 wherein said apparatus comprises a. a post b. wherein said post comprises a plurality of L shaped stems that are connected at the horizontal portion of said L shaped stem c. wherein said post may comprise of two, three, four, five, or more L shape stems.

18. The apparatus in claim 17 wherein apparatus comprises a mount and stake head, a. wherein said mount and stake head comprises a plurality of horizontal stems that are connected at right angles to form a square or rectangular shaped mount and stake head to contain said post whereby, said post does not pivot inside of said mount and stake head.

19. The apparatus in claim 12 wherein said stiff pliable wrap comprises any of paper, metal, sheet metal, fabric, plastic, wire, metal or any combination of the aforementioned said wrap material is supported by friction resistance produced by at least one vertical support leg being substantially vertical, having a slight slope.

20. The apparatus in claim 12 further comprising, a. a post b. wherein said post comprises a plurality of L shaped stems that are connected at the horizontal portion of said L shaped stem, at equally spaced intervals c. wherein said post may comprise of two, three, four, five, or more L shaped stems d. a light e. wherein said light comprising a casing that comprise of two, three, four, five, or more stem notches, whereby said stem notches hold said light in place via the vertical portion of said L shaped stems of said post each hold said light in place via the leg notch and enables said light to slide into said post in a face up or face down position f. wherein said light or a light casing comprises a plurality of flush sides, two three, four, or five, that are level with the side of said apparatus between two said vertical support legs whereby said stiff wrap is not disturbed by any pointy edges on said light when in use.

21. An apparatus for making and displaying decorative ornamentation and lanterns comprising:

a. a plurality of vertical support legs b. wherein said vertical support legs are each connected to a horizontal stem to form said apparatus or frame c. wherein said apparatus comprises a gradually increasing first diameter or width of said apparatus that gradually extends outward from the top of the apparatus, whereby said apparatus is slightly narrower at the top d. wherein said gradually increasing diameter of said apparatus comprises a plurality of elevation points or locations along said vertical legs e. a post f. wherein said post comprises a plurality of L shaped stems that are connected at the horizontal portion of said L shaped stem, at equally spaced intervals, whereby said post is an open enclosure as to not obstruct light g. wherein said post may comprise of two, three, four, five, or more said L shaped stems h. a light i. wherein said light comprising a casing that may comprise of two, three, four, five, or more stem notches, whereby said stem notches hold said light in place via the vertical portion of said L shaped stems of said post, each holding said light in place via the leg notch j. wherein said light comprising a casing that may comprise of two, three, four, five, or more stem notches, whereby said stem notches hold said light in place and enables said light to slide into said post in a face up or face down position k. wherein said light or said light casing comprises a plurality of flush sides, two three, four, or five, that are level with the side of said apparatus between two said vertical support legs whereby said stiff wrap is not poked or punctured by any pointy edges on said light when in use l. wherein said apparatus is self-standing and self-supported m. wherein said apparatus is made of materials comprising any of metal wire, or metal, wood, or plastic.

22. The apparatus in claim 21 wherein said apparatus comprises a stopper a. wherein said stopper is removable and has an open center b. wherein said stopper fits over said apparatus c. wherein said a stopper comprises an open center and a plurality of arms, two, three, four, five or more that are parallel to a horizontal axis and fit horizontally around the outer perimeter said apparatus d. wherein said open center of said stopper may comprise a shape that is circular, triangular, square, or rectangular overall, depending on the shape of said apparatus e. wherein the apparatus having an increasing first diameter or width so that said apparatus gradually extends outward from the top of the apparatus, wherein said apparatus is slightly smaller at the top; wherein said apparatus comprises a plurality of elevation points or locations along said vertical supports;

f. wherein said stopper having a second diameter or width, so that said stopper is supported at various elevation points or locations on the apparatus by said increasing first diameter or width of said apparatus due to the difference in the first and second diameters or widths limiting vertical movement or slippage of the stopper beyond said preferred elevation points or locations, and g. wherein said horizontal arms are angled inwardly towards center of said apparatus so that when the apparatus or said lantern is lit, the arms are not obvious h. wherein said angled arms each meet to form a V shaped hook point whereby a removable light holder can be held securely i. wherein said stopper may be made of materials comprising any of metal wire, metal, plastic, or wood.

23. The apparatus in claim 22 wherein said stopper is adjustable, and a. wherein said stopper comprises an inner diameter or width that is changeable, whereby said stopper can be secured at various elevations on said apparatus b. wherein said stopper comprises a plurality of angled arms that, at least one end, comprises an anchor adjacently connected to said angled arm at a right or acute angle c. wherein said angled arms are pitched inwardly towards center of said apparatus whereby said angled arms are not very visible when said apparatus is lit up with light d. wherein said angled arms each meet to form a V shaped hook point whereby a removable light holder can be held securely.

24. The apparatus in claim 5, wherein said stabilizer comprises a plurality of foot hold tabs or a foot hold whereby said apparatus can be lifted with stabilizer when said frame stabilizer is lifted or carried, and a. wherein said foot tabs or foot hold are each parallel to a horizontal axis b. wherein said foot tabs or foot hold line a bottom perimeter of said frame stabilizer whereby said apparatus feet can rest on said foot hold.

25. An apparatus for making and displaying decorative ornamentation and lanterns comprising:

a. a plurality of vertical support legs b. wherein said vertical support legs are connected to form an apparatus or frame c. wherein said apparatus comprises a gradually increasing first diameter or width of said apparatus that gradually extends outward from the top of the apparatus, wherein said apparatus is slightly narrower at the top d. wherein said gradual increasing diameter of said apparatus comprises a plurality of elevation points or locations along said vertical legs e. a frame stabilizer f. wherein said frame stabilizer has a plurality of legs or walls, comprising three, four, five or more legs or walls, respectively g. wherein said frame stabilizer is self-standing and is supported by said legs or said walls h. a hollow center is formed by the plurality of walls adjoined to form an enclosed but hollow stabilizer comprising an open top and open bottom i. or, an open center is formed by said stabilizer belt comprising any of a circular, square, rectangular, triangular, pentagonal, hexagonal, heptagonal, or octagonal, polygonal shape j. wherein said stabilizer belt is adjoined to, at a right or obtuse angle, and held up by said stabilizer legs k. wherein said stabilizer comprises an open or hollow center, whereby said apparatus fits inside of said open or hollow center of said frame stabilizer l. wherein the frame stabilizer slides over said apparatus from the top, whereby said stabilizer belt, or said walls, surround the apparatus m. wherein said open or hollow center of frame stabilizer comprises a moderately loose fit around said apparatus, whereby said loose fit gives said apparatus sufficient room to tip, whereby said stabilizer acts as a separate and independent force that holds up the side of the apparatus that said apparatus is tipping towards, and pushes down on the side of the apparatus that is being lifted when tipping n. wherein said apparatus is self-standing and self-supported o. wherein said apparatus is made of materials comprising any of metal wire, or metal, wood, or plastic p. a post q. wherein said post comprises a plurality of L shaped stems that are connected at the horizontal portion of said L shaped stem, at equally spaced intervals r. wherein said post may comprise of two, three, four, five, or more L shape stems.

26. The apparatus in claim 25 further comprising a light, a. wherein said light or said light casing comprising at least two, three, four, five, or more stem notches, whereby said stem notches hold said light in place via the vertical portion of L shaped stems of said post, and enables said light to slide into said post in a face up or face down position, and b. wherein said light or said light casing comprises a plurality of flush sides, two three, four, or five, that are level with the side of said apparatus between two said vertical support legs whereby said stiff wrap is not disturbed or poked by any pointy edges on said light or light casing when in use c. wherein said post is at or near the top of said apparatus.

27. An apparatus for making and displaying decorative ornamentation and lanterns comprising:

a. a plurality of vertical support legs b. wherein said vertical support legs are connected to form a skeletal apparatus c. wherein the apparatus comprises three, four, five or more said vertical support legs d. wherein said apparatus having an increasing first diameter or width so that said apparatus gradually extends outward from the top of the apparatus, wherein said apparatus is slightly smaller at the top; said apparatus comprises a plurality of elevation points or locations along said vertical support legs e. a stopper post, and f. wherein said stopper post is a skeletal stopper that comprises a double stem apparatus, whereby said double stems fit the contour of said apparatus embodiment when pulled down onto the apparatus from the top g. wherein said stopper post having a second diameter or width, so that said stopper post is supported at various elevation points or locations along the apparatus by said increasing first diameter or width of said apparatus due to the difference in the first and second diameters or widths limiting vertical movement or slippage of the stopper post beyond said preferred elevation points or locations, and i. wherein said stopper post enables a light, tea light, or LED light or LED tea light to be placed at various elevations on said apparatus j. wherein said stopper post has a built-in post and is formed with double stems, so that it can slide down onto the apparatus from the top, and can slide over and below a cross intersection on said apparatus k. wherein said stopper post comprises a plurality of leg rests, comprising of three, four, or five leg rests, whereby said leg rests enable said stopper post to be elevated at a particular level on said apparatus by the leg rests, resting on said vertical support legs by said difference in the first and second diameters l. wherein said stopper post comprises a plurality of horizontal and vertical stems that are doubled, and each individual stem is parallel to its counterpart m. wherein said leg rest, comprises a closed rounded edge whereby it conforms to said vertical support leg and, then extends out into the top horizontal double stem, with a small distance separating the individual stems n. wherein said double stem extends horizontally, away from said leg rest, bends downward at a 90° angle into a vertical double stem that extends lengthwise on down, followed by another 90° bend at the bottom, where said double stems 94 bend upward to into a 90° angle that is parallel to a horizontal axis o. wherein said double stems next extend inwardly toward the center of said stopper post, where each said horizontal stem then extends in opposite directions, at a 90° angle where each said stem meets up with another said stem to form another said double stem that is a replica of the first said stem;

p. wherein said double stems are placed at equally spaced intervals, to form a stopper post comprising of two, three, four, five or more said double stems; said double post is formed having an opening that slides completely over the top of said apparatus embodiment and fits over said apparatus like a female plug q. wherein said stopper post may slide down over said apparatus, until it is stopped by friction from the difference in diameters or widths of said apparatus and said stopper post via said leg rests r. wherein said apparatus is self-standing and self-supported.

* * * * *